US009262698B1

(12) United States Patent
George et al.

(10) Patent No.: US 9,262,698 B1
(45) Date of Patent: Feb. 16, 2016

(54) METHOD AND APPARATUS FOR RECOGNIZING OBJECTS VISUALLY USING A RECURSIVE CORTICAL NETWORK

(71) Applicant: VICARIOUS FPC, INC., Union City, CA (US)

(72) Inventors: Dileep George, Mountain View, CA (US); Kenneth Alan Kansky, Union City, CA (US); David Scott Phoenix, Berkeley, CA (US); Christopher Laan, San Francisco, CA (US); Wolfgang Lehrach, Woodside, CA (US); Bhaskara Marthi, Mountain View, CA (US)

(73) Assignee: Vicarious FPC, Inc., Union City, CA (US)

( * ) Notice: Subject to any disclaimer, the term of this patent is extended or adjusted under 35 U.S.C. 154(b) by 0 days.

(21) Appl. No.: 13/895,058

(22) Filed: May 15, 2013

Related U.S. Application Data

(60) Provisional application No. 61/647,085, filed on May 15, 2012, provisional application No. 61/729,080, filed on Nov. 21, 2012.

(51) Int. Cl.
  G06K 9/62 (2006.01)
  G06E 1/00 (2006.01)
  G06K 9/66 (2006.01)
  G06N 3/08 (2006.01)

(52) U.S. Cl.
  CPC ... *G06K 9/66* (2013.01); *G06N 3/08* (2013.01)

(58) Field of Classification Search
  CPC ......... G06K 9/66; G06K 9/4628; G06K 9/32; G06K 9/00127; G06K 9/00456; G06N 3/08
  USPC ......... 382/159, 224, 156, 103; 706/14, 16, 20
  See application file for complete search history.

(56) References Cited

U.S. PATENT DOCUMENTS

| | | | | |
|---|---|---|---|---|
| 7,711,663 | B2 * | 5/2010 | Weng | 706/14 |
| 7,739,208 | B2 * | 6/2010 | George et al. | 706/16 |
| 8,103,603 | B2 * | 1/2012 | George et al. | 706/16 |
| 8,200,025 | B2 * | 6/2012 | Woodbeck | 382/224 |
| 8,290,886 | B2 * | 10/2012 | George et al. | 706/16 |
| 8,332,339 | B2 * | 12/2012 | Nugent | 706/25 |
| 8,340,435 | B2 * | 12/2012 | Duong et al. | 382/203 |
| 8,369,652 | B1 * | 2/2013 | Khosla et al. | 382/284 |
| 8,442,321 | B1 * | 5/2013 | Chang et al. | 382/181 |
| 8,798,375 | B1 * | 8/2014 | Chang et al. | 382/197 |
| 2009/0299929 | A1 * | 12/2009 | Kozma et al. | 706/25 |

* cited by examiner

*Primary Examiner* — Sheela Chawan
(74) *Attorney, Agent, or Firm* — Jeffrey Schox; Thomas Gwinn

(57) ABSTRACT

A computer-implemented method for object recognition using a recursive cortical network comprising receiving an input image at an input module, applying a trained recursive cortical network (RCN) to the image using an inference module to activate child features of the RCN, selecting pools of the RCN containing the activated child features, propagating the selection of the pools to identify probabilities of one or more high-level features matching one or more objects in the input image.

22 Claims, 23 Drawing Sheets

METHOD AND APPARATUS FOR RECOGNIZING OBJECTS VISUALLY USING A RECURSIVE CORTICAL NETWORK

CROSS-REFERENCE TO RELATED APPLICATIONS

This application claims the benefit of U.S. provisional patent application No. 61/647,085 filed May 15, 2012 and U.S. provisional patent application No. 61/729,080 filed on Nov. 21, 2012, the disclosures of which are incorporated herein by reference in their entirety.

BACKGROUND OF THE INVENTION

1. Field of the Invention

Embodiments of the present invention generally relate to cortical networks, and more specifically, to a method and apparatus for recognizing objects visually using a recursive cortical network.

2. Description of the Related Art

Recognizing visual objects is a task that humans excel, while computers have difficulty in performing. Humans are capable of seeing an object once, such as a utensil, and then recognizing or imagining that object in other positions, contexts, or under different distortions or transformations. However, computers tend to be restricted to recognizing particular poses or sizes fed into object recognition systems. If a person views a chair from different angles or different distances, the image on the person's retina varies dramatically. Different presentations of a chair need not be similar in their "pixel" representation on the human retina for the human brain to understand and recognize an object as a chair, whereas current object recognition systems work best when there is pixel level similarity between the input image and the training images.

The human brain achieves this by storing an invariant representation of the chair. The invariant representation is used to recognize the chair in various orientations, distances, scales, transformations, lighting conditions, occlusions, and the like, while being highly selective for the identity of the object. Some object recognition systems are currently using cortex-like computations for object recognition in order to mimic the way the human brain recognizes objects. However, those systems lose accuracy when rotations, distortions, occlusions, or other transformations are applied, and are not highly selective to the objects being recognized.

Therefore, there is a need in the art for a method of object recognition to be invariant to a wide variety of transformations while being selective to the identity of the object.

SUMMARY OF THE INVENTION

Embodiments of the present invention relate to a method and apparatus for object recognition using a recursive cortical network comprising receiving an input image at a training module, applying a trained recursive cortical network (RCN) to the image using an inference module to activate child features of the RCN, selecting pools of the RCN containing the activated child features, propagating the selection of the pools to identify probabilities of one or more high-level features matching one or more objects in the input image.

Further embodiments of the present invention relate to a method and apparatus for image generation using a recursive cortical network (RCN) comprising activating a high-level feature-node of the RCN according to user entered request, selecting one of one or more pools associated with the high-level feature node at random, selecting a winning feature from each of the one or more pools based on lateral connections and composing an image of an object based on the selected winning features from each pool.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present disclosure generally include a method and apparatus for generating a recursive cortical network for representing objects. According to an embodiment of the present invention, a network is used to represent objects, where the network is used to represent information and perform computations like the neocortex found in mammalian brains. According to some embodiments, a Bayesian network is used to describe the probabilistic model. A Bayesian network is a statistical model that uses a graph to represent a set of random variables and conditional dependencies. For example there are various nodes in a given Bayesian network, each node having a conditional probability. The network is composed of distributed processing elements that implement summation, multiplication, exponentiation, or other functions on its incoming "messages". The network is a generative model in that it specifies a way of generating patterns, which may have spatial components, for example, pixels of an image, or temporal components such as a video sequence over a period of time.

Figure 1:
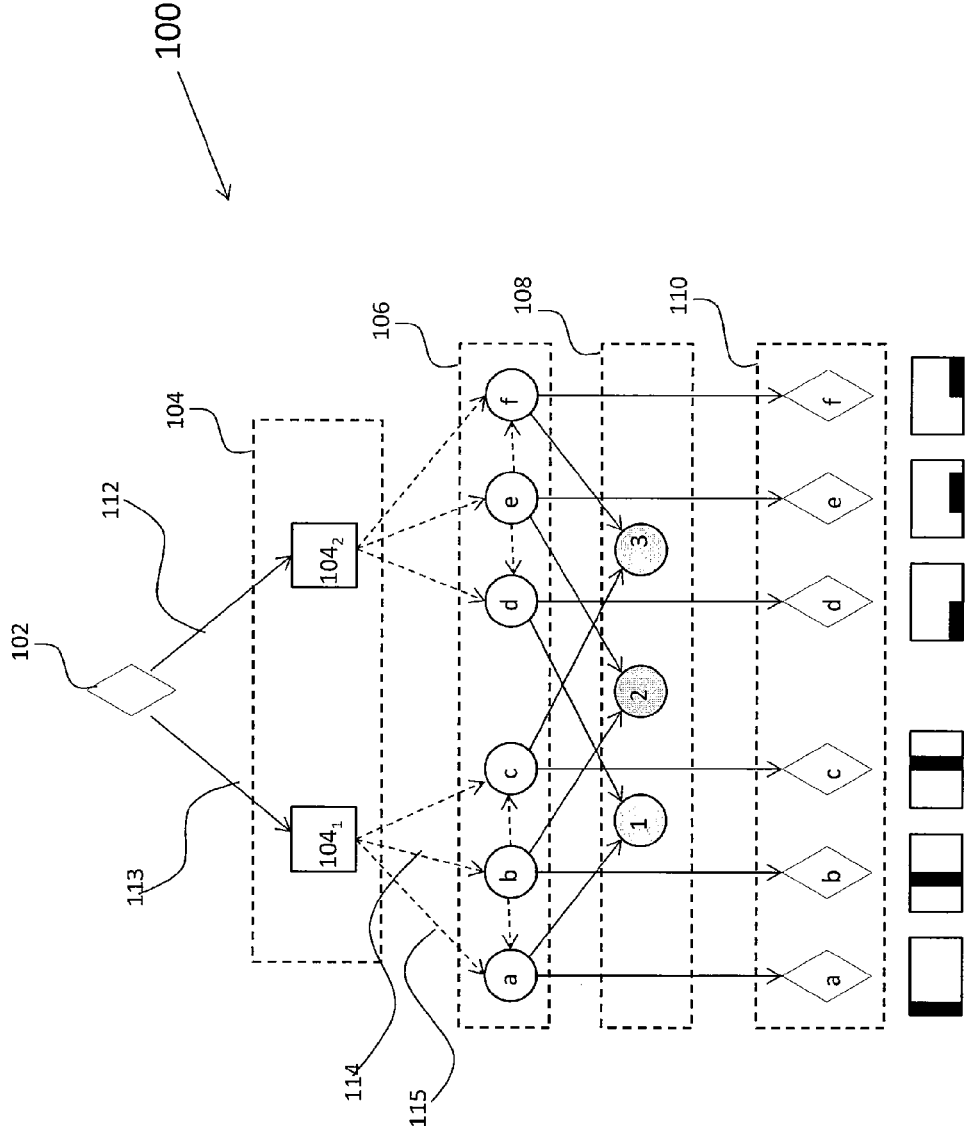
FIG. 1 is an illustration of a recursive cortical network (RCN) in accordance with embodiments of the present invention.

FIG. 1 is an illustration of a recursive cortical network (RCN) 100 in accordance with embodiments of the present invention. The network 100 is merely a representation of a portion of a full representation of an object. The network 100 is comprised of a parent feature 102, one or more pools 104, a group of parent-specific child features 106, parent-specific child feature lateral constraints 108, and child features 110. A detected object may comprise several features, one such feature being parent feature 102, e.g., a leg of an animal.

In the shown embodiment, the one or more pools 104 consist of pool $104_1$ and $104_2$. The higher level parent feature 102 is mapped to a set of lower level features such as the features 106a-f such that the activities of the parent feature 102 is determined by the activities of a lower level set of features. The solid arrow 112 and the solid arrow 113 represent the mapping between the parent feature 102 and the features pools $104_1$ and $104_2$ and the solid nature of the arrow indicates an "AND" constraint, i.e., that both features pools $104_1$ and $104_2$ are active at the same instance in time. The dashed arrow 114 and the dashed arrow 115 indicate that pool 104 is an exclusive or non-exclusive "OR" constraint among features a, b, and c.

Finally, lateral constraints $108_{1-3}$ indicate an "AND" relationship between the different parent specific child features of different pools. For example, there is a lateral AND constraint $108_1$ between feature 106a and 106d, and these features are constrained such that both must be active in their pools at the same time with some probability P based on the weight or "strength" of the connection. This constraint probability is the probability that the constraint exists. According to exemplary embodiments of the present invention, these lateral AND constraints are unweighted, and thus have 100% probability of existing.

Using the various constraints and mappings represented in the RCN 100, patterns can be generated by selecting a higher level "parent" feature and traversing down the RCN 100 selecting various feature nodes consistent with the constraints and connections established above. Therefore, selecting any parent feature automatically means that feature pools connected to the parent feature are selected as well with probabilities P0 ... PN given the state of the other selected nodes.

For example, parent feature 102 represents an animal leg, and feature pool $104_1$ represents the top portion of the leg, and feature pool $104_2$ represents the bottom portion of the leg. The features 106a, 106b and 106c represent various positions of the top portion of the leg, and the features 106d, 106e and 106f represent various positions of the bottom portion of the leg. If parent feature 102 (the leg) is selected, then feature pools $104_1$ and $104_2$ are both selected (in this simplified case, P=1). Then, at the same instance in time, features 106a and 106d are selected, because there is a lateral constraint 108-1 between them. This selection produces the child features 110a-f. These child features 110a-f may also have their own associated feature pools, child features and the like, similar to parent feature 102, forming a hierarchical recursive cortical network 208.

Assume, for example, that each pool $104_1$ and $104_2$ randomly selects one of its parent-specific child features. The features 106a-106f and their connections encode the constraints that are imposed between the child-feature selections of different pools of the same parent feature. In FIG. 1, if parent-specific-child-feature 106a is selected in pool $104_1$ then, the "AND" constraint enforces that parent-specific-child-feature 106d is selected in pool $104_2$.

An example of a selection that is not permitted is selecting 106b and 106f, because 106b has an AND constraint with 106e and 106f has an AND constraint with 106c. According to one embodiment, a pool from pools 104 is first chosen, and a parent-specific child feature from 106 is chosen, ensuring generation of configurations that are consistent with the lateral constraints. Then only those features are selected that are consistent with the already selected features from features 106, when picking from subsequent pools from pools 104.

According to the exemplary embodiments described above, the constraints are hard, i.e., any assignment that does not satisfy all constraints has probability zero. In other embodiments, however, the constraints may be soft. In these other embodiments, Soft constraints may be implemented within the probabilistic setting by attaching probabilities to lateral constraints, such that each violated constraint decreases the probability of the assignment, but does not make the probability zero. Such models are known in the literature as noisy OR and noisy AND models, as described in "*Probabilistic Reasoning in Intelligent Systems*". Judea Pearl, 1998

Lateral Constraints

Figure 3:
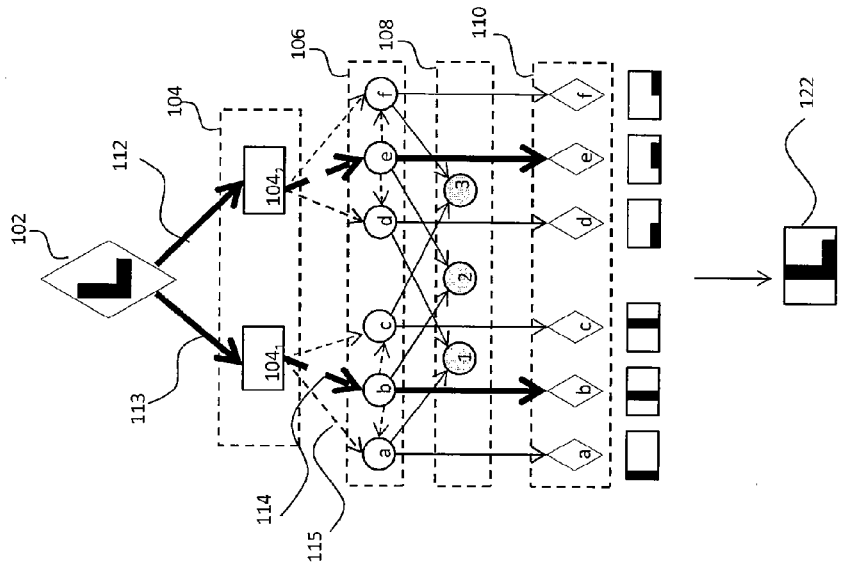
FIGS. 2-4 depict the use of lateral constraints in generating objects in accordance with exemplary embodiments of the present invention.
Figure 2:
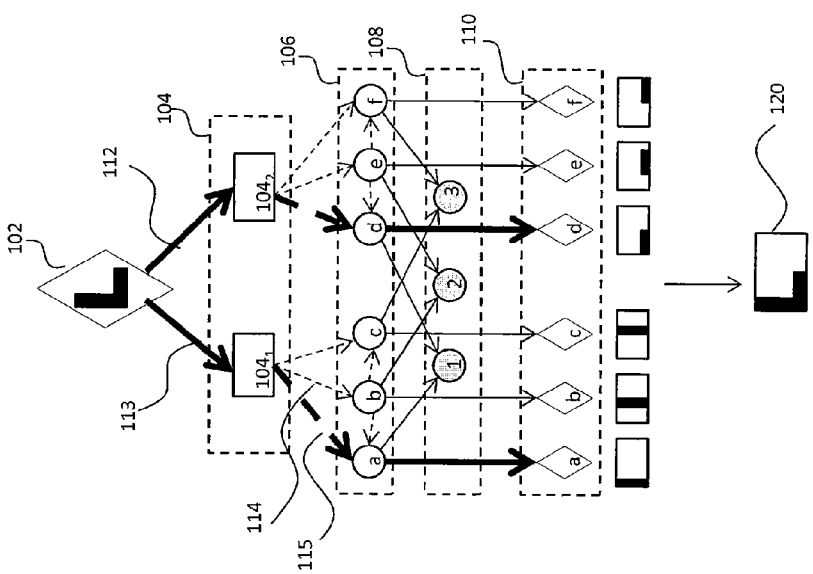
Figure 4:
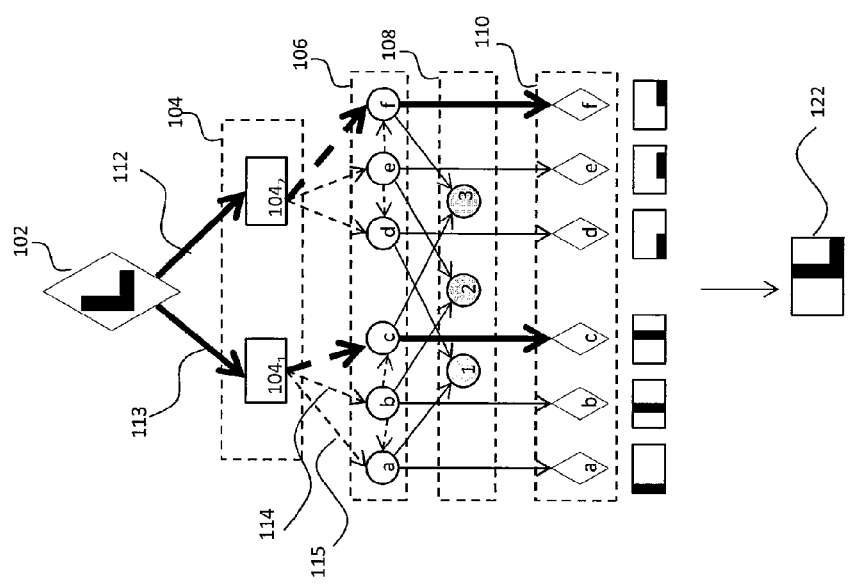

FIGS. 2-4 depict the use of lateral constraints in generating objects in accordance with exemplary embodiments of the present invention. According to FIG. 2-4, child features 110a to 110f are shown. Child features 110a-110c represent a single vertical line, whereas child features 110d-11f represent a short horizontal line. According to FIG. 2, feature pool $104_1$ is selected, and the parent-specific child feature 106a is selected. Because of the lateral constraint 108-1, the parent-specific child feature 106d is also chosen. This results in the combination of child features 110a and 110d, forming a left bottom corner 120. The lateral constraints result in a geometrically consistent image where the two subparts line up.

Similarly, in FIG. 3, the selected (bold arrows) parent specific child feature is 106b. The parent-specific child feature 106b has a lateral constraint 108-2 with parent-specific child feature 106e; therefore, if 106b is selected 106e has a determined probability of also being selected. Subsequently, the child features 110b and 110e are selected, resulting in a "middle" corner 122.

In FIG. 4, the selected (bold arrows) parent specific child feature is 106c. The parent-specific child feature 106c has a lateral constraint 108-3 with parent-specific child feature 106f; therefore, if 106c is selected 106f must also be selected. Subsequently, the child features 110c and 110f are selected, resulting in a bottom right corner 124 being generated.

If the lateral constraints 108 in FIGS. 1-4 are ignored, each pool $104_1$ and $104_2$ may select a child feature independently of the other pools. Accordingly, without lateral constraints, the parent feature 102 will correspond to an invariant representation of 9 different patterns, corresponding to all combinations that can be generated by selecting one feature from pool $104_1$ and another feature, independently, from pool $104_2$. During generation, lateral constraints 108 restrict the kinds of patterns that are allowed to be generated. For example, if the lateral constraints are not present, the child feature 110a can be selected/combined with the child feature 110e, and such a pattern would be considered a valid result, despite it not being a valid corner. Similarly a "T" junction would be considered a valid pattern.

Similarly, during recognition, the lateral constraints 108 restrict the patterns for which the parent feature is active. If the constraints 108 are not taken into account, a "T" junction or a disconnected corner would activate the parent feature 102 just as much as an intact corner would. The lateral constraints 108 ensure that this does not happen. In general, the lateral constraints 108 allow fine-tuned control of the selectivity of the parent feature 102.

In some instances, it is important that these lateral constraints 108 be specific to the parent feature 102 and not common among all the child features 110a-110f. For example, if a different parent feature is used to represent a T junction as opposed to a corner, it would still use the same child features of vertical line and horizontal line. In this case, the T junction representation would need a different set of lateral constraints compared to the corner representation lateral constraints 108. Having lateral constraints that are specific to the parent features enables such fine control.

Temporal Connections

According to some embodiments of the present invention, the members of a pool can have relations to each other that specify the order they occur in time. The specifications need not be a strict ordering. Instead, those might specify a set of possible pool-members that can occur at the next time instant, given the pool-member or set of pool-members that occurred at the current time instant, analogous to the specifications in a Markov chain.

Figure 5:
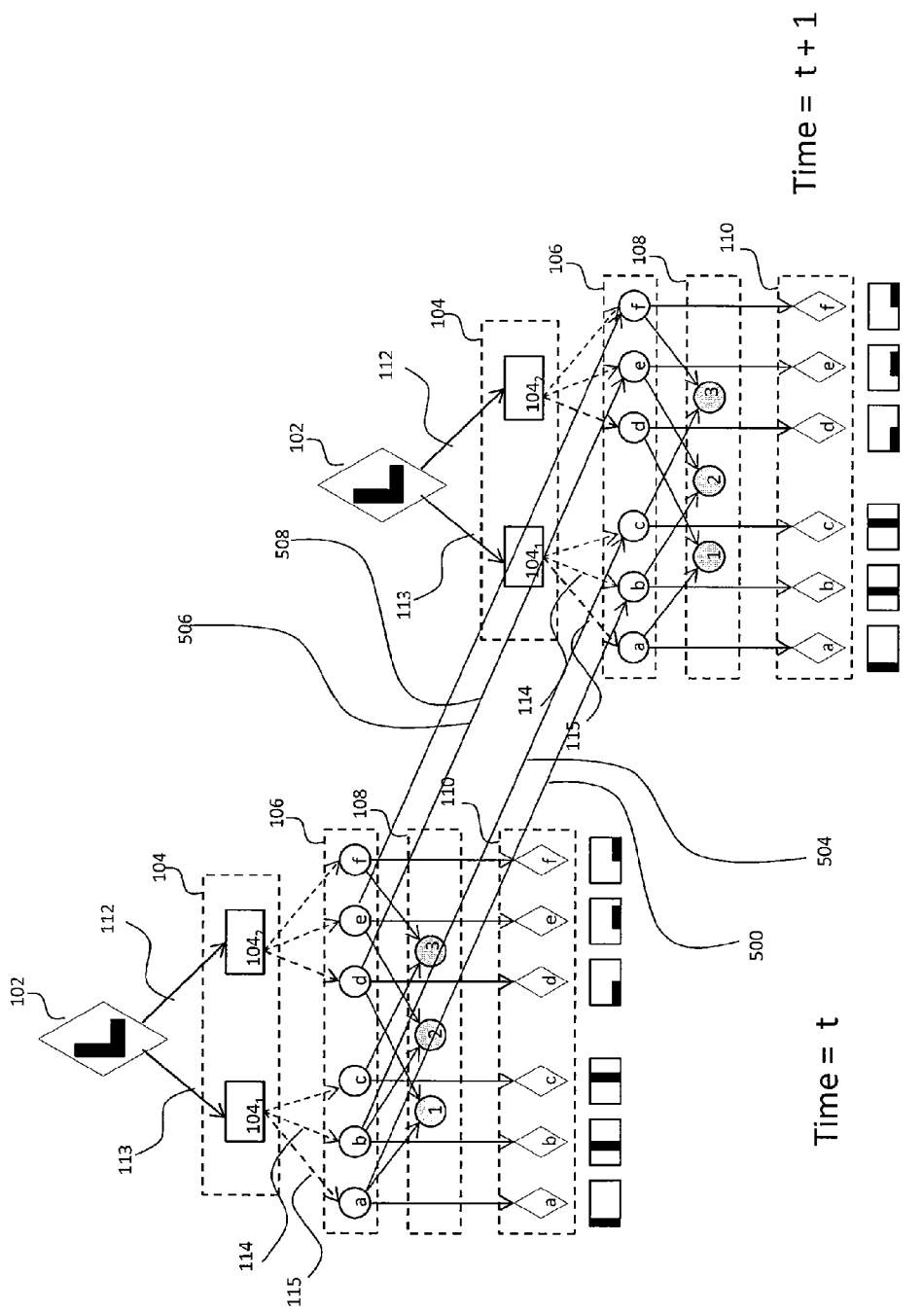
FIG. 5 depicts temporal connections between parent-specific child features in accordance with exemplary embodiments of the present invention.

FIG. 5 depicts temporal connections between parent-specific child features in accordance with exemplary embodiments of the present invention. The temporal relationships between the parent-specific child features 106a-106f can be represented by showing two time steps, for example, as shown in the figure below. The figure illustrates that pool-member 106a at time t goes to pool-member 106b at time t+1, and pool-member 106b at time t goes to pool-member 106c at time t+1. Based on the temporal connections, pool $104_1$, represents the sequence 106a to 106b to 106c, using the two-time-slice representation, i.e., the vertical line moving from the left corner to the right corner. For pool $104_2$, FIG. 5 represents the sequence of parent-specific child feature 106d to 106e to 106f, i.e., the horizontal line moving from left to right.

According to embodiments of the present invention, network 100 may also capture more complex temporal relations between the members of a pool. An example of a more complex temporal constraint is that 106c is active at time t+1 only if 106a and 106b are active at time t. Another example is when 106a is active at time t, 106b or 106c can be active at time t+1. Another kind of complex temporal relationship is higher-order temporal relationships, for example that 106c can be active only if 106a was active two steps in the past Yet another kind is temporal dependencies between multiple time steps, for example that 106c is active at time t+2 only if 106b was active at t+1 and 106a was active at t.

In the previous discussion the members of a pool were all child features. According to embodiments of the present invention, a pool member may consist of a set of child features combined according to a function such as MAX, SUM, histogram, or other functions. The case of child features being in a pool is a special case where the functions are identity functions on individual child features.

An example function that can be used to composite child features to be members of a pool is the AND function. For instance, the members of a pool can be 106a, 106b and 106c, 106d, 106e, where 106a, 106b, 106c, 106d, 106e are child features. The second pool member above consists of two child features.

Similar to the variations in the construction of pools, lateral constraints between parent-specific-child features can be of different kinds. In the previous discussion, these constraints were between pairs (i.e., parent-specific child feature 106a and parent-specific child feature 106d), and of the AND kind. In general the constraints could be any functional combination of the other parent-specific-child-features, child features, other constraints, or pools. A particular form of variation where the lateral constraints are specified as an AND-OR tree is of particular interest, because the AND constraints allow decomposition of a feature into subparts, while the OR constraints allow invariance.

Probabilistic Interaction at Nodes in the Recursive Cortical Network

The nodes in the RCN 100 as pictured above in FIGS. 1-5 represent binary random variables as in a Bayesian network. The terms are defined as follows:

Feature Node—

A feature node is a binary random variable node that could have multiple parents and multiple children. Feature nodes are represented using diamonds in the FIGS. 1-5.

Feature Node: Parent Connections—

When multiple parents are involved, the interactions between them is usually of the superposition kind where the child node is ON when either of the parent nodes are ON. Such multi-parent interactions can be probabilistically modeled in the node using canonical models such as Noisy-OR and Noisy-Max gates.

Feature Node: Child Connections—

The feature node child connections encode the probabilistic relations between the feature and the pools. Typically all the pools of a feature are expected to be active if the feature is active, but this behavior can be tuned using a probability table.

Each link from a feature node to a pool node encodes a probability table of the kind P(Pool|Feature). This table has 4 entries.

| Feature\Pool | FALSE | TRUE |
|---|---|---|
| FALSE | 1-q | q |
| TRUE | p | 1-p |

In a typical configuration where the all pools are ON when the feature is ON, p and q will be zero. However, other values of p and q are possible, and represent soft constraints as discussed above.

Pool Nodes—

Pool nodes are binary nodes and are represented using rectangles. The pool nodes in an RCN subnetwork have one or more parent connections, and these links represent the probability table described above. Pool-nodes have multiple outgoing links and the meaning of these links depend on whether they are considered instant-by-instant or as part of a temporal sequence.

Considered instant by instant, these links represent an OR function over the pool-members, with associated probabilities. Another way to represent this is as a multinomial random variable. Let there be Npm pool members in a particular pool. Consider a binomial random variable M that takes on values 1 . . . , Npm. The outgoing links from a pool node represent the probability distribution P(M|Pool).

Considered in a sequence, P(M|Pool) defines the probability that a particular pool member will be chosen as the starting member for a sequence. Subsequent pool-members are then generated in a temporal sequence by following the temporal transition functions of that pool member until an endpoint is reached.

Pool-Member Nodes—

Pool members, represented using circles in FIGS. 1-4, are binary random variables, one of which gets selected when a pool is selected according to the distribution P(M|Pool). The pool-members represent functional combinations of child-features. For instance, pool-member 1 could be child-feature 1 AND child-feature 2.

Lateral Constraint Nodes—

Lateral constraint nodes, represented using filled circles, are binary nodes whose observations are permanently instantiated to 1. The probability tables in these constraint nodes implement the kind of constraint that is enforced between the parent nodes that connect to the constraint node. For example, a hard AND constraint between two parent nodes would be implemented using a probability table that makes the probability of a '1' equal to 1.0 if the parent nodes are both on, and 0.0 otherwise. Conditioning on the constraint node equaling '1' thus makes the probability of any assignment that violates the constraint equal 0.0.

Constraint interactions can go beyond the pair-wise interactions represented in FIGS. 1-4. For example, it is possible to have a constraint node have more than two parents. It is also possible to have logical relationships between these parents be implemented as part of the constraint node.

Figure 6:
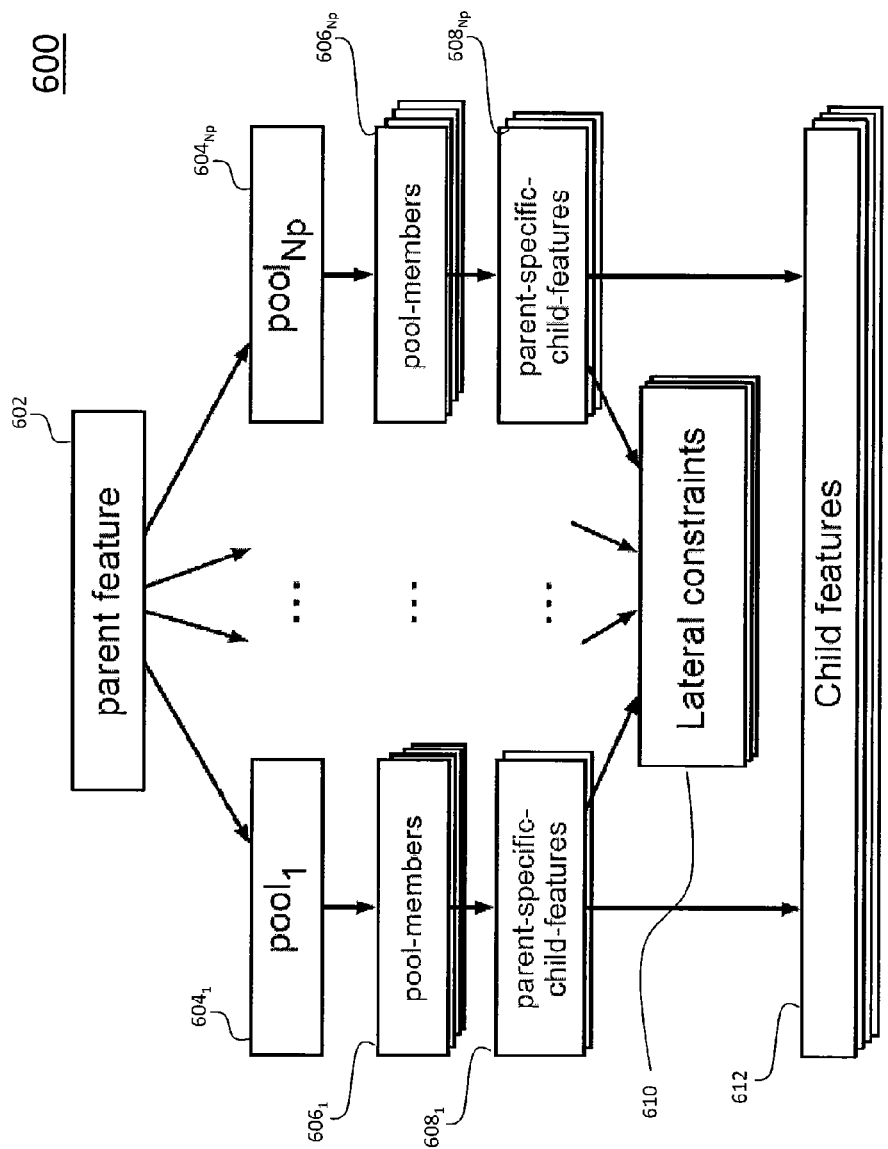
FIG. 6 depicts a generalized structure of a recursive cortical network (RCN) according to exemplary embodiments of the present invention

FIG. 6 depicts a generalized structure of a recursive cortical network (RCN) according to exemplary embodiments of the present invention. The RCN 600 comprises a parent feature 602. The parent feature 602 is associated with one or more pools $604_1$ to $604_{Np}$. Each pool has one or more pool members $606_1$, where the pool $604_{Np}$ has pool members $606_{Np}$. Each pool $604_1$ to $604_{Np}$ also has a group of parent specific child features $608_1$ to $608_{Np}$, respectively. The groups of parent-specific child features $608_1$ to $608_{Np}$ share lateral constraints 610 amongst each other. Finally, each parent-specific child feature is drawn from all child features 612 in the network 600.

Figure 7:
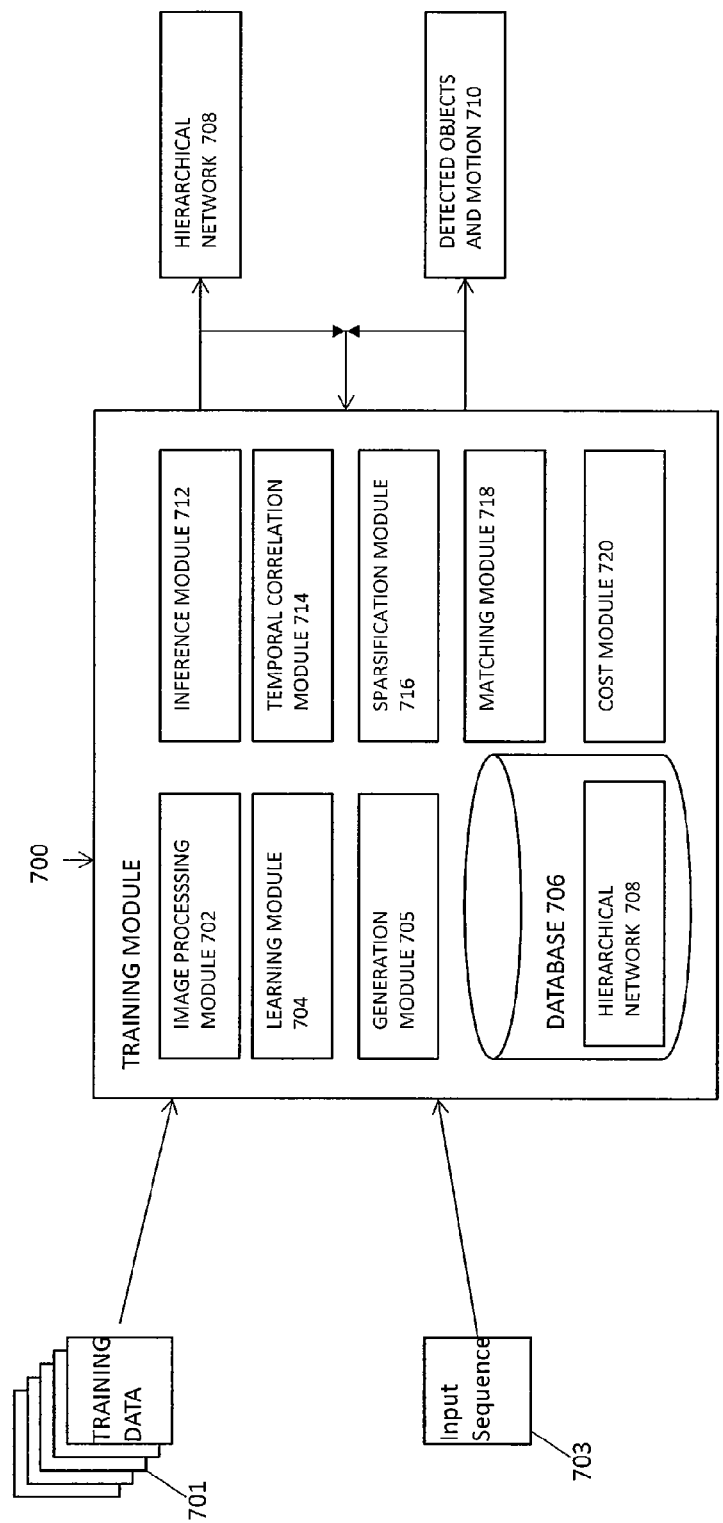
FIG. 7 is a functional block diagram of a training module in accordance with exemplary embodiments of the present invention.

FIG. 7 is a functional block diagram of a training module 700 in accordance with exemplary embodiments of the present invention. The training module comprises an image processing module 702, a learning module 704, a generation module 705, an inference module 712, a temporal correlation module 714 and a sparsification module 716. The training module 700 takes training images 701 as an input and outputs a hierarchical recursive cortical network 708. The RCN 708 also may be stored in the database 706, or stored external to or remotely from the training module 700. The training module 700 also takes an input sequence 703 and detects objects and motion 710 from the input sequence 703.

According to one embodiment, the training data 701 may consist of images of automobiles including sedans, compact cars, minivans, sport utility vehicles, vans and the like. According to other embodiments, the training data 701 may comprise audio clips, video clips, or the like. The image processing module 702 recognizes and detects objects in the training data 701 as well as their attributes and features. Attributes may include the pose of the camera, the scale, rotation, and distortions, the contours, shapes, colors, lighting, and textures that comprise objects, and the like. Features include, for example, front driver door, front passenger door, trunk of the automobile, hood of the automobile, whether the automobile is two-door or four-door, height, length, width, light shape, tires, and the like. The image processing module 702 detects features in the training data and stores the features in a database 706.

The learning module 704 constructs a hierarchical network 708, for example, a RCN, for the data stored in the database 706. The hierarchical network 708 is also fed back into the training module 700 for future reference, or stored, according to one embodiment, in database 706. For example, the learning module 706 retrieves all data relating to the vehicles and constructs a network 708 similar to RCN 100 as shown in FIG. 1. An example parent feature 102 may be a car frame, where the different pools represent the door configurations and sizes. Further, there are lateral constraints between adjacent doors indicating that the position of the driver door and the passenger door on one side of the vehicle must remain well aligned with each other. There are also lateral constraints between each wheel and each other wheel, between the wheels and the adjacent doors, between the hood and the windshield, and between all adjacent parts of the car. These lateral constraints ensure that each piece of the car has limited freedom to move with respect to the other parts of the car.

For example, a photograph of a normal car will receive a higher recognition score than the same photograph where pieces of the car have been rearranged, due to the lateral constraints, even though both images contain the same information. In the case of the example car photograph, some of these lateral constraints would be specific to a parent feature representing compact cars. Other parent (or higher level) features might represent pickup trucks, sports cars, or sport utility vehicles. Each of these different parent features may share some lateral constraints in common with the compact car feature. They may also have different lateral constraints that encode the unique visual relationships that exist between the parts of these other types of cars. For example, consider the lateral connection that encodes the expected range of distances between the wheels of a compact car in the picture. A parent feature for sports cars would have wheels like the compact car, but use a different lateral connection between wheels because sports cars generally have larger expected distances between front and back wheels.

A parent feature can also have a parent specific copy with parent-specific child features with a set of alternative lateral constraints. During this learning process, the learning module 704 will learn, for example, that a sedan has four doors, with a rear hood at a lower level than the roof of the sedan based on real world data. In some embodiments, the lateral constraints are established over some transformations of the features, such as scaling, and not other transformations such as rotations.

The training module 700 is further capable of generating an image or video of an object that it has trained on. For example, the generation module 705 can query the database 706 to determine some lower level child features, such as 110a-f in FIG. 1. The features 110a-f were captured using nodes 106a-f, with lateral constraints $108_{1-3}$. Given the lateral constraints, one of the training images can be generated by travelling up the network 100 and selecting the features which are "AND" constrained such as 106a and 106d, and the like.

The training module 700 also takes an input sequence 703, which may be composed of one or more images, and detects objects within the image based upon the previous training the module 700 has already received and the data stored in database 706 such as detected objects, features, as well as the previously generated hierarchical network 708.

Inference/Recognition in an RCN Subnetwork

The inference module 712 detects objects by traversing the network 708 and previously detected objects according to methods disclosed below. The inference module 712 is capable of static and temporal inference as shown and described with respect to FIG. 8, amongst other types of inference. Inference is the process of determining the posterior distribution at all the nodes in an RCN given some evidence at a subset of the nodes. Different inference mechanisms can be used on such graphical models. In addition, the inference mechanisms can be used to answer different queries about the network given evidence. For example, a query could be about the combination of states in a set of nodes that maximize the likelihood of the evidence. Yet another query could be about the likelihood maximizing state of a particular node, without regards to making specific assignments to the other nodes of the network. A third query could be about the twenty most likely joint states of the hidden nodes given the evidence.

According to one embodiment, the belief propagation or max propagation algorithm uses local message passing to derive an approximation of posterior distributions. These posteriors can be intuitively understood as probability distribution of the presence of a feature at a given level. In the case of binary nodes, the posterior at a node specifies the probability of it being ON/OFF given the evidence. In some other embodiments, those of ordinary skill in the art would recognize that the nodes in the network 708 may be categorical or multinomial as well as binary. When a set of binary nodes are modeled together using a multinomial variable, the posteriors specify the relative probabilities between the states of that variable given the evidence. The posterior could be represented directly as probabilities, ratios, or as log of the ratios. Evidence at the "leaf nodes" is usually presented in the form of likelihoods which also can be represented using ratios or log ratios. In addition, Maximum-aposteriori (MAP) queries can be answered using the max-prop version of belief propagation.

Belief propagation or Belief revision involves passing messages between nodes and performing computations in the nodes under different assumptions. The links between nodes can be thought of as bidirectional conduits of messages. In one implementation, messages which flow upstream represent likelihoods and messages which flow downstream represent probabilities. Different variations and approximations of belief propagation/revision can be used to answer different queries about an input image to varying degrees of accuracy.

Those of ordinary skill in the art would recognize that the described probabilistic model contains independence assumptions which may not match with real distribution of images in the world. According to one embodiment, if a hierarchical network contains loops, i.e., two child feature nodes overlap in their representation; the inference is corrected by performing correction for loopy belief propagation. For example, the two child features may represent the same pixel of an image. For an input image, both child features will be "activated" and the probabilities of each feature node will be propagated up to their pool. When the pool probabilities are multiplied to determine the likeliness of a high-level feature matching a feature in an input image, the doubly counted feature node will cause the inference to change probability. This is referred to as loopy belief propagation. According to this embodiment, loopy belief propagation can be accounted for. In this embodiment, if a feature has a particular probability, after matching, a backtracking operation is performed to determine whether two feature nodes represented the same feature. Refer FIG. 22, method 2200 for more details.

The temporal correlation module 714 couples with the image processing module 702, the learning module 704 and the generation module 705 to assist in forming the hierarchical network 708 taking into account temporal variations of features, such as a dog or cat's wagging tail. According to one embodiment, design parameters can be initialized in the temporal correlation module 714, where the design parameters are configured to consider features as temporally related when the features occurred either a time delta prior, or after the current feature within a particular radius of importance.

The learning module dispatches the sparsification module 716, which also couples with the generation module 705 to aid in generation of the hierarchical network 708 by creating a sparse representation of an object in one of the training images 701, where sparsity is determined by the size of the dictionary of features used to represent the input and the density of these features in the representation.

According to one embodiment, the sparsification module 716 establishes an initial skeletal hierarchy with a few features when receiving an input image. The sparsification module 716 dispatches the matching module 718 to perform a feature match on each level of the skeletal hierarchical network, which will result in zero perfect matches at the top level if the input image cannot be represented using the existing network. The initial matching begins at the top level, or the parent feature, of the network. If the input image is of a cat, the parent level feature may not be selected, or "activated", but once feature level two is traversed, it is possible that some intermediate feature representations may match, such as a leg, or a head. The portion of the image that matches a feature in the network is then subtracted from the input image.

The new input image with a subtracted portion is then subjected to further matching in the matching module 718. The next feature level is then traversed. For example, there are no features in the network representing a body, but there are features in the network representing parts of a body. Thus, the matching module 718 proceeds to lowest feature level, feature level one, features are matched, and the portion of the image representing those features is removed from the input image.

After matching is performed, there may be portions of the image which are unrepresented in the network, i.e., "gaps." These gap features are added to the list of features in feature level 1. These new features at level 1 are then used in level 2 to build the next level of hierarchical representation of the image. In this manner, a sparse representation of the input image is achieved in the network. The skeletal hierarchy of the RCN, which encodes the hierarchical relationship between features at different levels can be constructed using other sparsification methods like Matching Pursuit, K-means clustering, or their variations.

In certain instances, the input image may contain noise or other visual defects which causes a corruption of the sparsification process. A relaxation method may be performed which executes a number of different trials on the best features in the RCN 708 and chooses a best solution. Examples of costs which can be considered during this process are the reconstruction accuracy or error, the total size of the dictionary, the marginal computational cost or memory requirements of a given feature dictionary and sparsification, and others.

According to one embodiment of the present invention, the learning module 704, coupled with the sparsification module 716 and temporal correlation module 714, then can take input of the same input image with a time delta and a translation delta. For example, there are two input images—one at time $t_1$ and one at time $t_2$, where the image at $t_2$ is of a cat displaced by x units from the cat at time $t_1$. If the matching module 718 attempts to match the cat at time $t_2$, the match will fail because of the translation. Therefore, the sparsification module 716 performs sparse decomposition on the input image at time $t_2$, i.e., the second cat.

This sparse decomposition produces a second disconnected hierarchical network. However, since the manual input process is aware that the cat at time t2 is the same cat as seen at time t1, the sparsification module 716 performs sparse decomposition up to feature level one. Then, the temporal correlation module 714 "pools" across first features in the first input image and second features in the second input image based on temporal proximity, i.e., features that occur nearby in time are pooled and previous or next time instant's are memorized. A particular cutoff is implemented to prevent temporally distant features from being temporally correlated. In cases where the training process is not aware of the identity of the input at different time steps, temporal pooling may still be achieved if the identity of the object in the input remains stable for some amount of time or follows a learnable pattern (e.g., does not change randomly from instant to instant). Image sequences that correspond to transformations of objects in the physical world have are generally temporally stable. In those instances the temporal correlation module 714 determines which features to pool across by observing the transformations that occur from one feature to another under a variety of image-sequence inputs.

The temporal correlation module 714 is used to learn hierarchical temporal invariance for inference. Each pool has a centered child feature, and temporal sequences may be learned that record the observed transitions from the centered child feature to other child features. Pools are configured to OR across the child features that are a fixed number of sequential steps away from the centered child feature. Then during inference, if any one of the pool's child features is observed, the pool will indicate that it has been observed as well, so the pool is temporally invariant to the observed transformations of its centered child feature. During learning, a transformation that exceeds the number of sequential steps allowed to a pool is represented using a different pool to continue the transformation. These pools are ORed together by parent pools in the hierarchy to achieve invariance across all observed transformations. Accordingly, the temporal invariance of the network is not limited by the number of sequential steps allowed to any given pool.

In other embodiments of the invention, the connections that capture temporal correlations or transformations can be generated by learning an image in one position, size, and rotation, and then applying the desired transformation at each level of the hierarchy. For example, translational invariance can be encoded by a convolution operation.

The generation module 705 can perform image completion and generation. For example, based upon trained images of photographs of particular individuals, a damaged photo can be repaired by calculating the pose of individuals in the photo, and generating a photo of a missing individual in that particular pose, based on the trained images and use of the hierarchical network 708 containing features of the missing individual or of similar looking individuals. In other instances, a photograph may be fed into the training module 700 to generate a picture of the missing individual in possible likenesses based upon the trained features. According to other embodiments, the training module 700 may be used in medical diagnostics, manufacturing defects, and the like.

Figure 8:
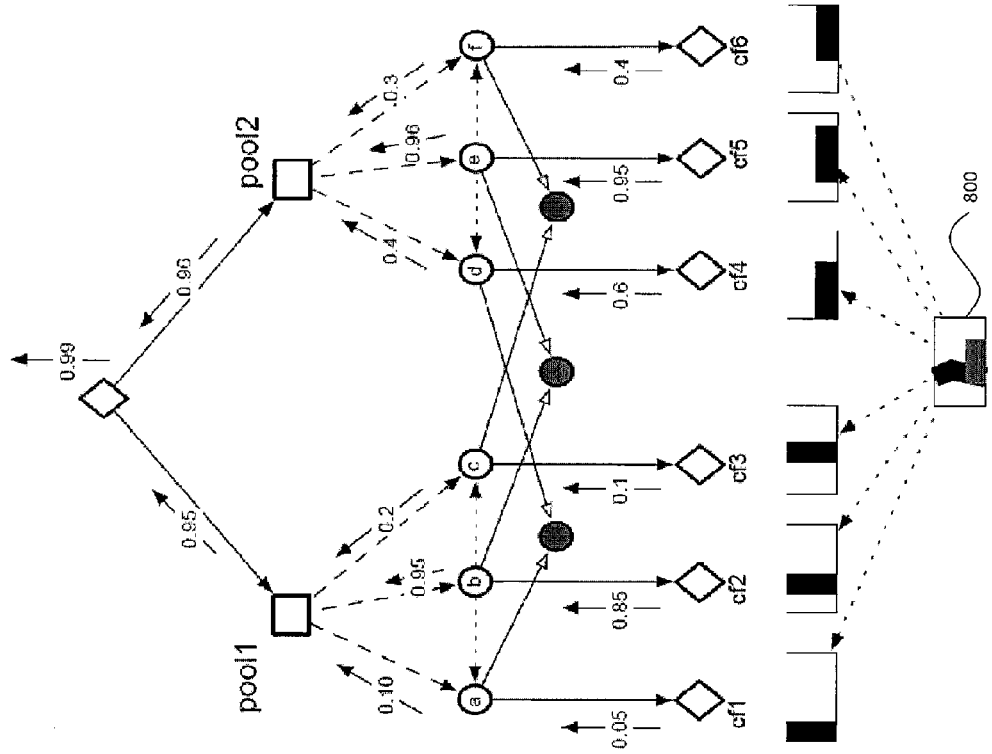
FIG. 8 depicts an example of an RCN performing static inference using the inference module of FIG. 7 in accordance with exemplary embodiments of the present invention.

FIG. 8 depicts an example of an RCN 800 performing static inference using the inference module 714 of FIG. 7 in accordance with exemplary embodiments of the present invention. FIG. 8 shows an example of messages propagated on the links of the RCN sub-network when an input image 800 is presented. These messages can be thought of as representing the likelihood of the evidence given that the node corresponding to the origin of the message is ON. For example the node cf2 has a higher likelihood compared to node cf1 because node cf2's representation is better aligned with the input evidence 800. The likelihood of a pool (represented by the arrows originating from the rectangular nodes representing pool1 and pool2) is the maximum over the likelihoods of pool members.

In addition, the inference module 714 of FIG. 7 may perform temporal inference. When the network is presented with a sequence of inputs corresponding to subsequent time instants, the network can propagate messages in time and perform temporal inference, where values calculated at different nodes represent the probabilities of given a sequence of evidence. The node values can be calculated with standard message passing in a Markov chain.

Figure 9:
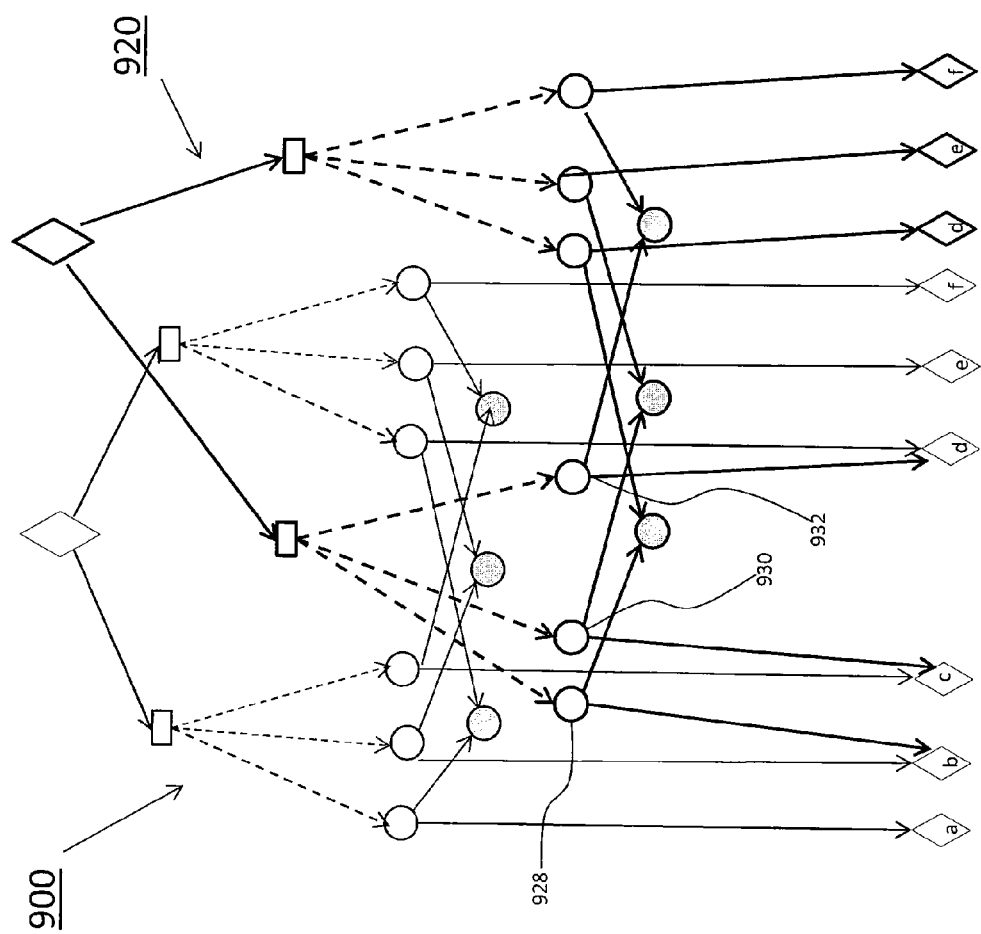
FIG. 9 is a depiction of RCN and RCN coupled together in accordance with exemplary embodiments of the present invention.

FIG. 9 is a depiction of RCN 902 and RCN 922 coupled together in accordance with exemplary embodiments of the present invention. According to FIG. 9, parent-specific child features 928, 930 and 932 share child features b, c and d between both the RCN 900 and RCN 920 (bold-lined). These shared connections introduce multi-parent interactions in the nodes of each RCN sub-network. During inference by the inference module 714, such interactions produce "explaining-away" effects in accordance with the behavior of the Bayesian Noisy-OR model for competing explanations of the same observation.

For example, if multi-parent interactions in child feature "b" of FIG. 9 are modeled using a "Noisy-OR" mechanism, then the RCN 900 and RCN 902 can compete for the evidence presented to this node. These competitions will come to effect through belief propagation mechanism or similar message passing mechanisms. For a detailed explanation of the Noisy-OR mechanism and belief propagation, please refer to "*Probabilistic Reasoning in Intelligent Systems*". Judea Pearl. 1998.

According to one embodiment, each RCN sub network has its own separate representations of pool members, lateral connections and parent-specific child-features. Accordingly, a child feature that participates in two different parent-features as part of two different RCN's will have different activation values during generation of patterns and during inference.

Some embodiments may rely entirely on global kernels to perform the same alignment function as lateral connections.

Sharing of Features and Representations

Figure 10:
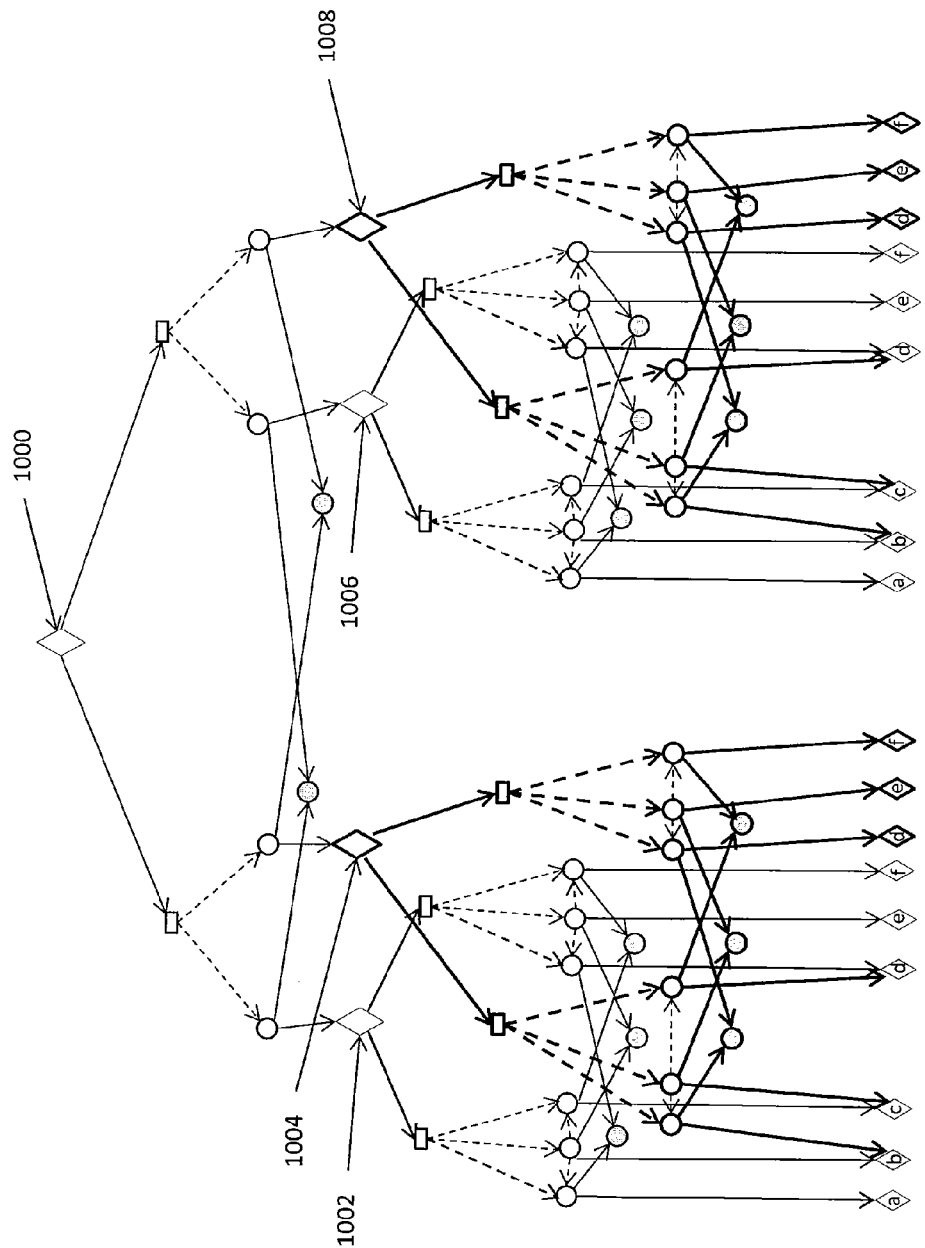
FIG. 10 depicts a level 2 RCN comprised of several interconnected RCN networks.

FIG. 10 depicts a level 2 RCN 1000 comprised of several interconnected RCN networks. In FIG. 10, the outputs of one set of RCNs become the input to another set of RCN's. For example, parent 1000 is the parent of an RCN hierarchy (hereinafter referred to as RCN 1000). The 1st level RCNs comprising RCN hierarchy 1000 are: RCN 1002 comprising parent feature 1002, RCN 1004, comprising parent feature 1004, RCN 1006 comprising parent feature 1006 and RCN 1008 comprising parent feature 1008. According to this embodiment, the child features of an RCN sub-network may be the parent features of any other RCN sub-networks. Conversely, the parent features of an RCN sub-network may participate as the child-features of other RCN sub-networks. For example, the parent feature 1002 and the parent feature 1004 are child features of RCN 1000. Additionally, child features of different RCN subnetworks are shared. For example, RCN 1004 shares child features b, c and d with RCN 1002. Similarly, RCN 1006 shares child features d and e of RCN 1002 and RCN 1006 shares child feature g from 1004.

Forming RCNs by connecting multiple RCN sub-networks introduce multi-parent interactions at several nodes in the network. These interactions can be modeled using different probabilistic models in the node, some of which were described above with reference to FIGS. 7-9.

Connecting RCN sub-networks in a hierarchy gives several advantages. One advantage is that the parent-features of one region can participate as child-features in multiple parent RCNs, resulting in compact and compressed representations because of reuse, not requiring as much storage space in a database or other storage system, and not repeating the same computations during some stages of inference.

Another advantage to interconnecting RCNs is that the invariant representations of a child RCN can be reused in multiple parent RCNs. One example of where this would be applicable is in the case of RCNs representing visual objects. The lower-level RCNs can correspond to parts of objects and the higher level RCNs represent how those parts come together to form the object. For example, the lower level RCNs can correspond to representations for the body parts of the image of a cow. Each body-part will be invariantly represented and will be tolerant to location transformations like translations, scale variations and distortions.

The higher level RCN then will specify how the body parts come together to represent a cow. Some of the lower-level body-parts of a cow could be reused at a higher level for representing a goat. For example, the legs of both these animals move similarly and hence those parts could potentially be reused. For example, the invariant representations learned for the legs of horses can be reused for representing goats.

Generating Samples from the RCN Hierarchy

FIGS. 1-5 and the corresponding discussion above gave exemplary embodiments about how to "imagine" or generate samples (images or videos of objects), from an RCN sub-network such as RCN 100. Generating samples from an RCN hierarchy, such as RCN 900, is performed similarly using the generation module 705. For example, the generation module 705 begins with top-level RCNs in parallel. The output samples of a top-level RCN determine which lower-level RCNs are active. Next, samples are generated by the generation module 705 from all the active lower-level RCNS concurrently. The output of the generation from the lower level RCNs determines the active RCN sub-networks at lower levels. This process continues until samples are generated from the RCN sub-networks at the lowest level.

According to some embodiments, RCN sub-networks may be configured to skip levels. Accordingly, the outputs of an RCN sub-network that skips a level will become involved in selecting the active RCN sub-networks at a lower level only when the other RCNs feeding into that level have been sampled from.

External Lateral Constraints

Figure 11:
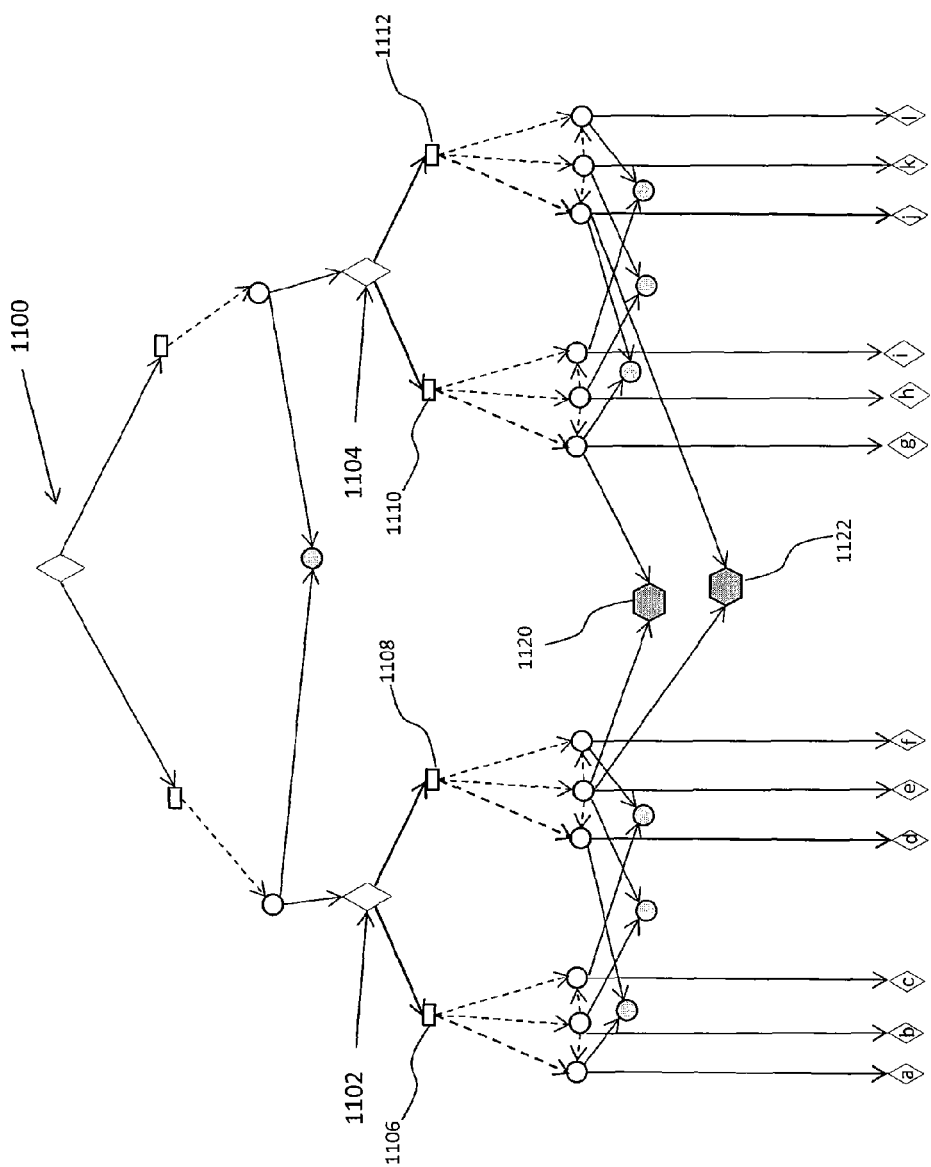
FIG. 11 depicts low-level RCN and a low-level RCN connected in a hierarchy, in accordance with exemplary embodiments of the present invention.

FIG. 11 depicts low-level RCN 1102 and a low-level RCN 1104 connected in a hierarchy 1100, in accordance with exemplary embodiments of the present invention. The RCN 1102 comprises a pool 1106 and a pool 1108. The RCN 1104 comprises a pool 1110 and a pool 1112.

External lateral constraints provide a mechanism for implementing coordination between pools in different RCN sub-networks. The lateral constraints 1120 and 1122 in FIG. 11 are represented using filled hexagonal nodes. The lateral constraints 1120 between nodes in different RCN sub-networks are AND nodes and they are instantiated with evidence=1, thereby introducing an AND constraint between the parents of the node, i.e., RCN 1102 and RCN 1104. FIG. 11 shows only two lateral constraints 1120 and 1120, however, generally, such constraints may exist between any parent-specific child features in two different RCN sub-networks. The parent-specific and nonspecific child features in an RCN can impose coordination between PSFCs in different pools of the same RCN sub-network, or coordination between PSFCs in different RCN sub-networks, or a combination of the two.

Figure 12:
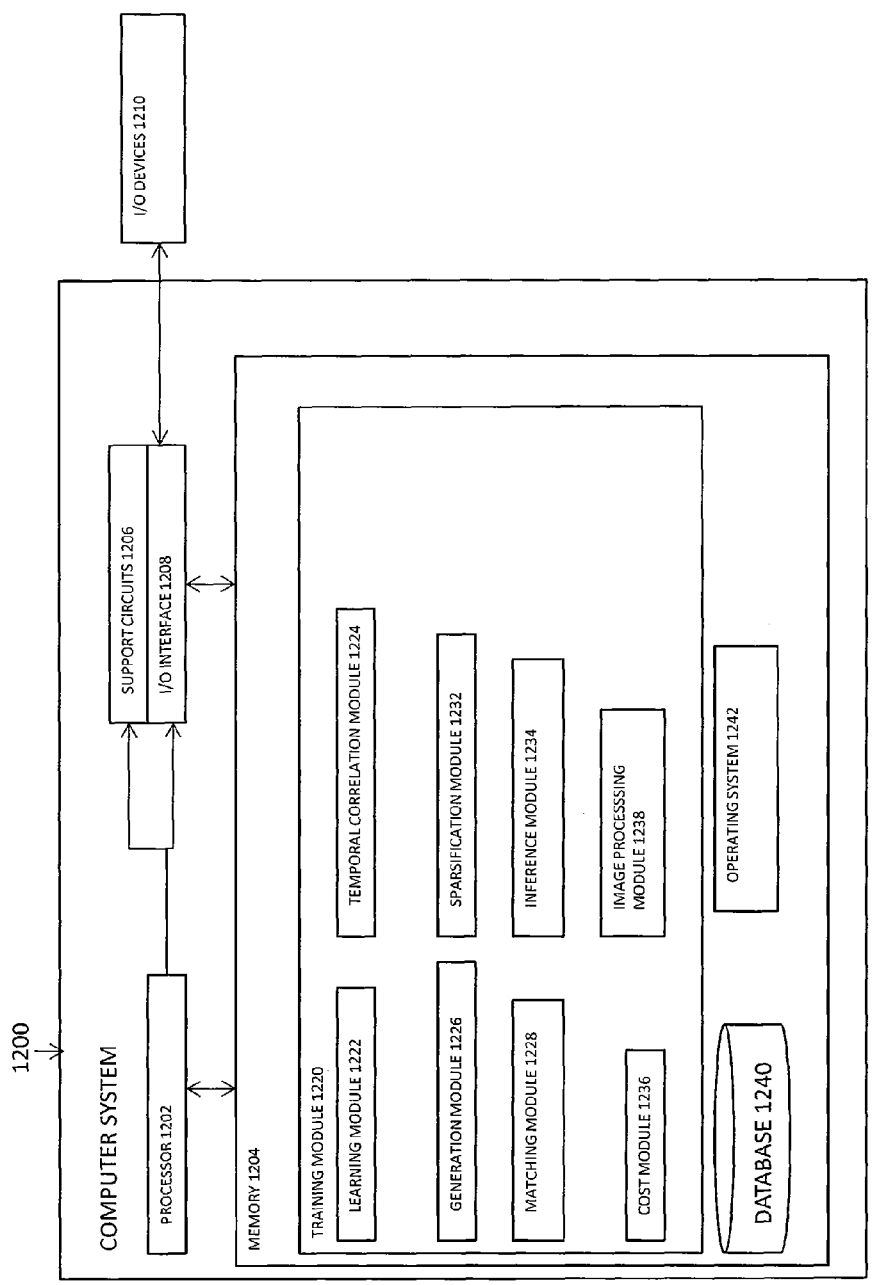
FIG. 12 is a block diagram of a computer system for implementing the training module in accordance with embodiments of the present invention.

FIG. 12 is a block diagram of a computer system 1200 for implementing the training module 700 in accordance with embodiments of the present invention. The computer system 1200 includes a processor 1202, a memory 1204 and various support circuits 1206. The processor 1202 may include one or more microprocessors known in the art, and/or dedicated function processors such as field programmable gate arrays programmed to perform dedicated processing functions.

The support circuits 1206 for the processor 1202 include microcontrollers, application specific integrated circuits (ASIC), cache, power supplies, clock circuits, data registers, input/output (I/O) interface 1208, and the like. The I/O interface 1208 may be directly coupled to the memory 1204 or coupled through the supporting circuits 1206. The I/O interface 1208 may also be configured for communication with input devices and/or output devices 1208, such as, network devices, various storage devices, mouse, keyboard, displays, sensors and the like.

The memory 1204 stores non-transient processor-executable instructions and/or data that may be executed by and/or used by the processor 1202. These processor-executable instructions may comprise firmware, software, and the like, or some combination thereof. Modules having processor-executable instructions that are stored in the memory 1204 comprise the training module 1220, further comprising the learning module 1222, the temporal correlation module 1224, the generation module 1228, the matching module 1228, the sparsification module 1232, the inference module 1234 and the image processing module 1238. The memory 1204 also comprises a database 1240.

The computer 1200 may be programmed with one or more operating systems (generally referred to as operating system (OS) 1242, which may include OS/2, Java Virtual Machine, Linux, Solaris, Unix, HPUX, AIX, Windows, Windows95, Windows98, Windows NT, and Windows 2000, Windows ME, Windows XP, Windows Server, among other known platforms.

At least a portion of the operating system 1242 may be disposed in the memory 1204. In an exemplary embodiment, the memory 1204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

Figure 13:
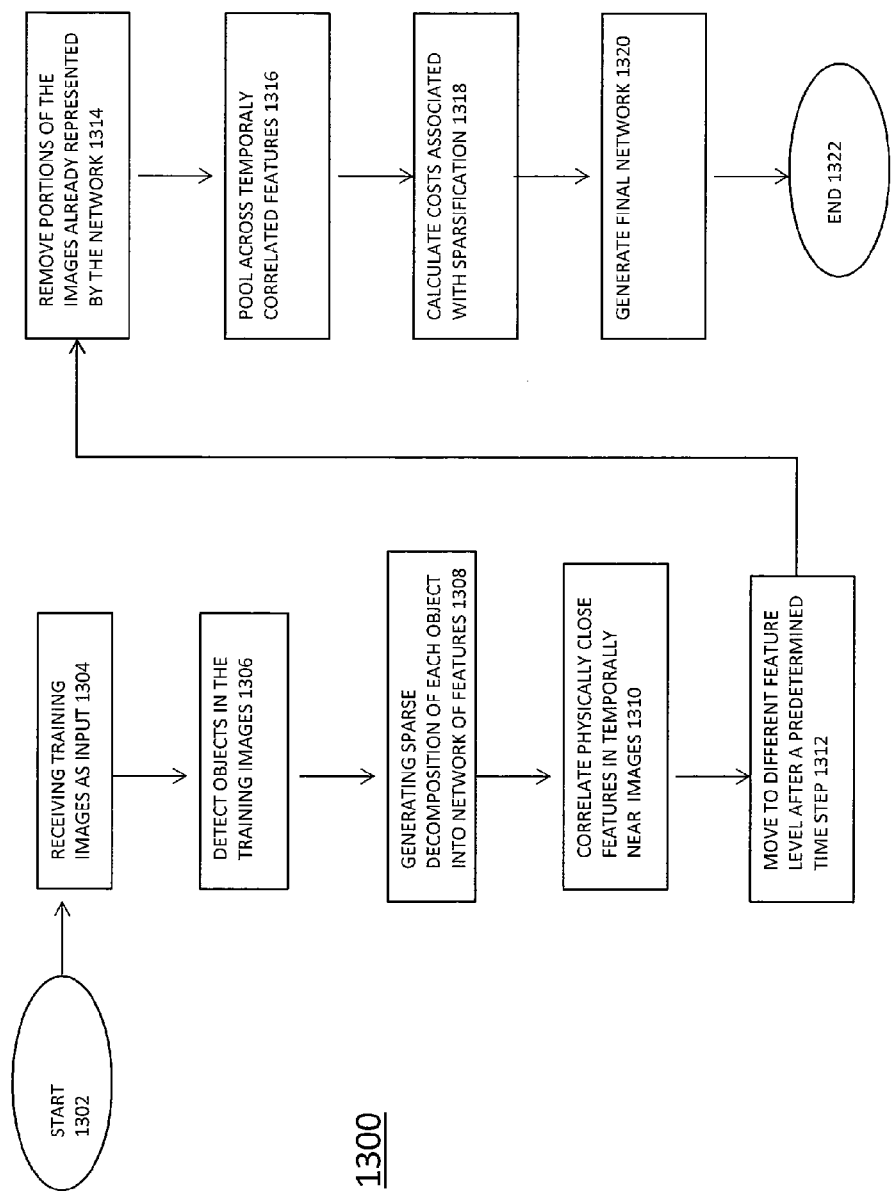
FIG. 13 is a flow diagram of a method for hierarchical sparsification in accordance with exemplary embodiments of the present invention.

FIG. 13 is a flow diagram of a method 1300 for hierarchical sparsification in accordance with exemplary embodiments of the present invention. The method 1300 is an implementation of the training module 1220 as executed by the processor 1202 of the computer system 1200. The method begins at step 1302 and proceeds to step 1304.

At step 1304, training images are received as input by the training module 1220. The training images are sequential images of everyday objects and can span a wide array or be limited to particular set of subjects. At step 1306, the image processing module 1238 processes the image by filtering the images for noise, and detects objects in the training images.

The method 1300 then proceeds to step 1308, where the sparsification module 1232 generates a sparse decomposition of each object into a network of features. At step 1310, physically close features are correlated in temporally near images. At step 1312, a different feature level is established after a predetermined time step.

The method then proceeds to step 1314, where portions of the image which are already represented by the network are removed from the original image, to avoid duplicating features. At step 1316, pools are established across features which are temporally correlated. Costs associated with the sparsification are calculated at step 1318. Finally, the sparsely populated network is built by step 1320. The method ends at step 1322.

Figure 14:
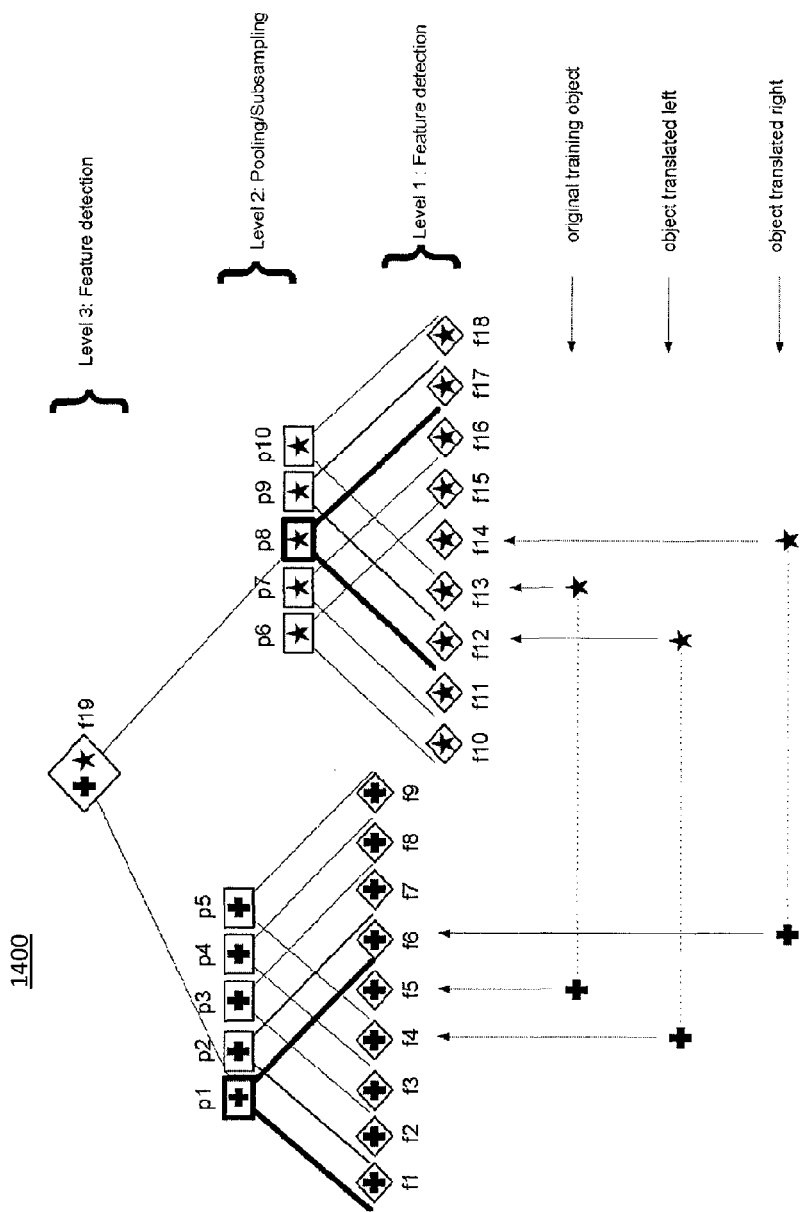
FIG. 14 depicts a three level hierarchical network with pooling in accordance with exemplary embodiments of the present invention for addressing misalignment between features and pools in a hierarchical network employing alternate layers of feature detection and pooling.

FIG. 14 depicts a three level hierarchical network 1400 with pooling in accordance with exemplary embodiments of the present invention for addressing misalignment between features and pools in a hierarchical network employing alternate layers of feature detection and pooling. The network 1400 may represent a part of a convolutional neural network, Neocognitron, HMAX or similar models.

Level 1 is a feature detector level, i.e., the image processing module 702 of FIG. 7 may use Level 1 to detect features in input data. For the sake of simplicity, the input image will be referred to as an image, though any other types of data such as video, audio or the like may be substituted. Level 2 of the network 1400 performs pooling and a sub-sampling operation. The sub-sampling operation is performed by the image processing module 702 by sampling the input image into sub-regions of a grid, each sub-region representing a pool at its center. Level 3 of the network 1400 represents another feature detector level operating on the outputs of Level 2. According to this embodiment, the network 1400 is represented in one dimension, though if the input image is a two-dimensional image, the network 1400 will also be a two-dimensional network. According to other embodiments, the network 1400 may operate on three-dimensional models and will be represented as a three-dimensional network.

The network 1400 illustrates how an object consisting of a plus (+) and a star (*) is represented as a feature (feature f19) at Level 3 of the network 1400. Level 1 comprises the component features, i.e., the stars (*) and the pluses (+) stored at all possible positions of an input image. In FIG. 14, 9 exemplary positions are shown for each component, however, more may exist in the network according to embodiments of the present invention.

Level 2 of the networks 1400 shows ten pools, p1-p10, five pools for each feature. The response of each pool is the max (or another similar pooling function) over the activations of the features within it. The diagonal lines emanating from each pool p1-p10 represent the extent of the pools. For example, pool p1 contains features f1 to f5, i.e., five translations of the plus symbol. Pool p7 contains five translations of the start, labeled f11 to f16. Accordingly, FIG. 14 depicts that each pool in Level 2 of network 1400 is invariant to five positions of the features it pools over.

In addition to the pooling operation that is densely tiled (i.e. occurring at every position in which a feature occurs), the hierarchical network 1400 also employs a sub-sampling operation. The sub-sampling operation, performed by the image processing module 702, determines which pool outputs are transmitted to the next level, thereby participating in features at the next higher level. In convolutional neural networks and other similar models, the sub-sampling grid is fixed, independent of the object to be represented. In FIG. 14, the pools that are selected after sub-sampling are shown using bold lines. In this figure, pool p1 and pool p8 are the ones selected by the sub-sampling grid.

With that selection of pool p1 and p8 for the sub-sampling grid, the plus activates feature f5, which falls within pool p1. The star part activates feature f13, which falls with pool p8. The co-occurrence of these pools is represented in the Level 3 feature f19 in the network 1400.

Each pool in Level2 of this network is invariant to five positions of the feature it pools over. However, because of how the features in the object (plus and star) is aligned within the pools that are selected by the sub-sampling gird, the combined object has very limited translation invariance. If the combined object shown in node f19 is translated to the left, its component features remain within their original pools only for one positional translation to the left, beyond which the star component falls out of pool p8. If the object in f19 is translated to the right, the plus component drops out of pool p1 at the very first translated position to the right, rendering the representation not invariant at all to translations to the right.

Figure 15:
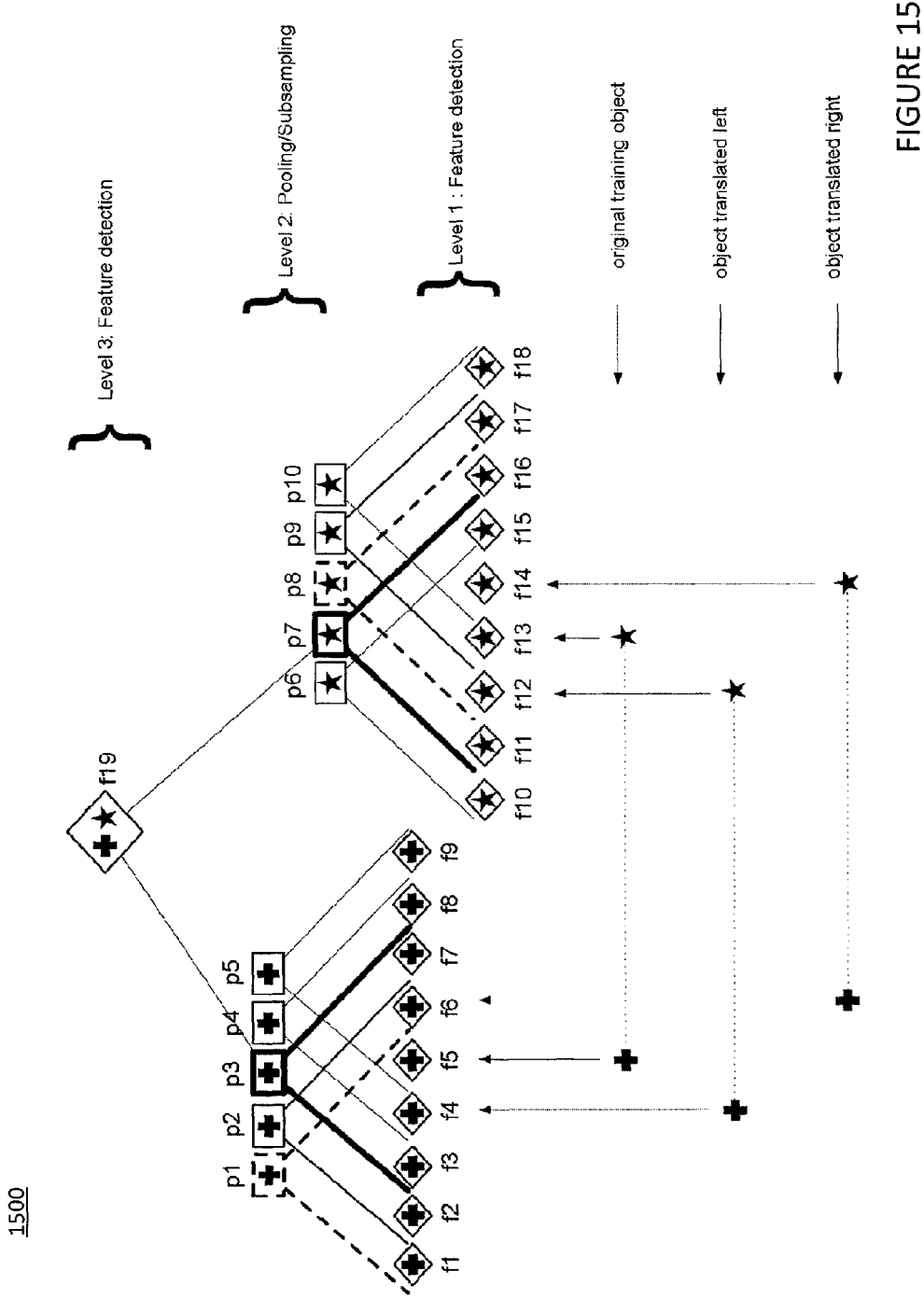
FIG. 15 depicts a hierarchical network in accordance with exemplary embodiments of the present invention.

FIG. 15 depicts a hierarchical network 1500 in accordance with exemplary embodiments of the present invention. According to FIG. 15, the arrangement of the selected pools make the representation of the combination object in feature f19 as invariant as the pools themselves. The higher level feature f19 now represents the co-occurrence of pool p3 and pool p7. This representation centers the Level 2 pools along the Level 1 components of the feature at Level 3. Accordingly, centering the pools on lower level feature components results in a higher degree of invariance.

Figure 16:
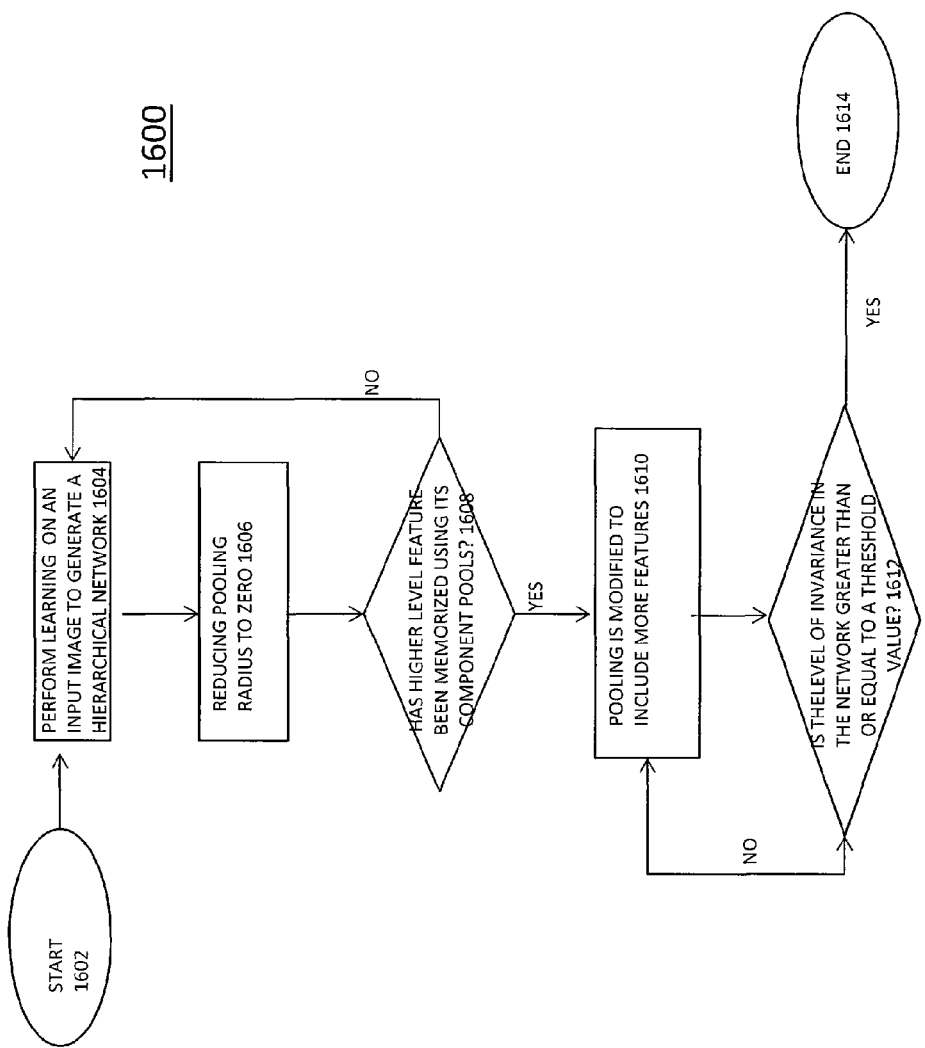
FIG. 16 depicts a method for learning hierarchical networks in accordance with exemplary embodiments of the present invention.

FIG. 16 depicts a method 1600 for learning hierarchical networks in accordance with exemplary embodiments of the present invention. The method begins at step 1602 and proceeds to step 1604.

At step 1604, the method 1600 performs learning on an input image using the learning module 704 to produce a hierarchical network 708, as shown in FIG. 7. At step 1608, the pooling radius is reduced to zero during training by the training module 700, i.e. a pool is centered by default and only contains one feature, for example, pool p1 from FIG. 15 would only contain feature f1, pool p2 will only contain feature f2, etc. According to this embodiment, higher level features are learned such that pools are centered on the components of the higher level features. Therefore, one feature actives only one pool. Since only one pool is activated for each feature present, sub-sampling is unnecessary. For example, in FIG. 17, a training object is presented as input where feature f5 and f13 active pool p3 and pool p7, respectively, in network 1700. Instead, the higher level feature f19 is memorized as the co-occurrence of all the active pools, which in this case are pools p3 and p7.

Subsequently, the method 1600 proceeds to step 1610, where it is determined whether a higher level feature is memorized using its component pools. If the higher level feature is not memorized using its component pools, the method reverts back to step 1604. If the higher level feature is memorized using its component pools, the method 1600 proceeds to step 1612, where the pooling is modified to include more features.

Figure 18:
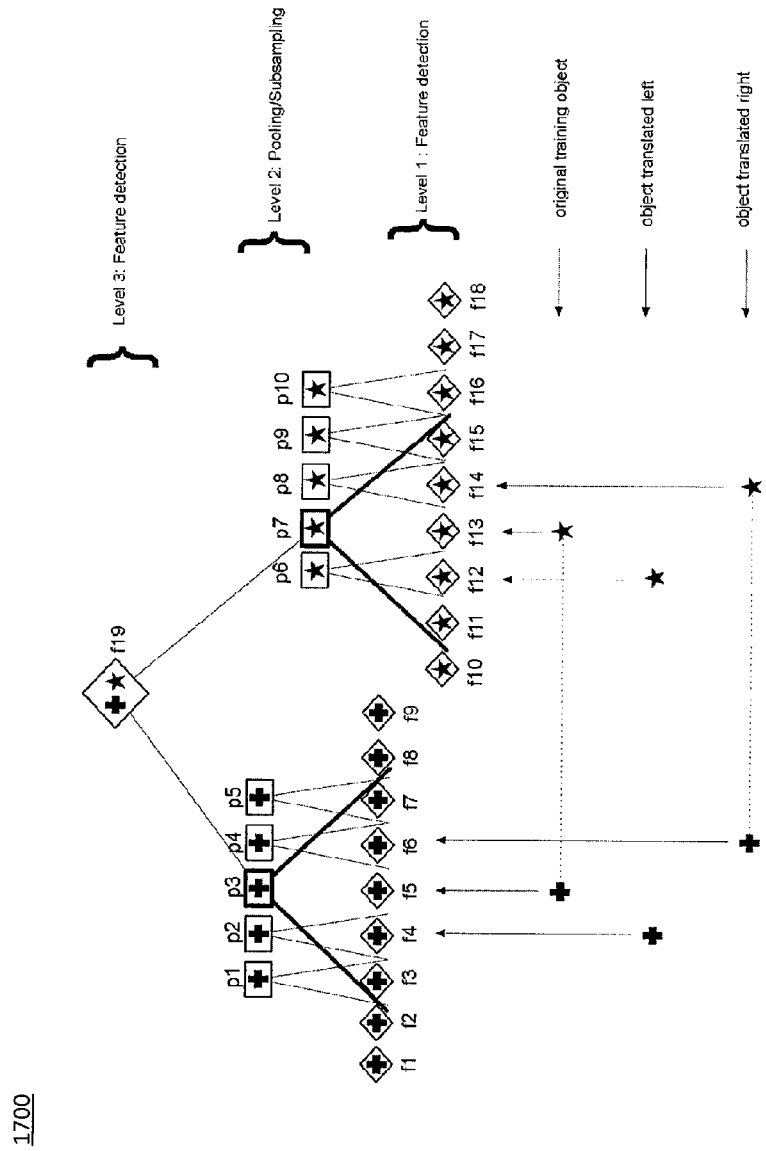

According to one embodiment, the pooling radius is increased symmetrically in all directions from the center. For example, FIG. 18 depicts the expansion of pools p3 and p7 of network 1700 from training size to include two additional features each on the left and right, making each pool invariant to five positions of translation. Accordingly, the feature f19 is also invariant to five positions of translation of the training object because the components of the features are synchronized with pools p1-p10, i.e., the components occur at the same offset at the center of the pool.

According to another embodiment, the pooling is modified by using the temporal order of data presentation, after the hierarchical feature representation is learned. According to this embodiment, the pools are generalized to include transformations other than positional translations. Transformations are observed in subsequent inputs after a higher level feature is learned. The lower-level features of the transformed input are recorded into the existing pools of the higher-level features using some matching heuristic. For example, transformed lower-level features may be matched using spatial proximity.

The method then proceeds to step 1614, where it is determined whether the level of invariance is greater than or equal to a threshold value of invariance. Invariance can be quantified in many ways, for example as the number of time steps, transformation steps (such as rotation or scaling), or translation distance for which a pool remains active for a given input. According to some embodiments, the threshold value of invariance may be different according to the type of data being trained upon. Optionally, a tradeoff between invariance to transformation and specificity is calculated to determine whether to proceed to step 1614. For example, a threshold for translation invariance is reached for a given level in the hierarchy, in some instances. However, if the level of invariance is greater than or equal to the threshold invariance, the method 1612 terminates at step 1614.

Figure 17:
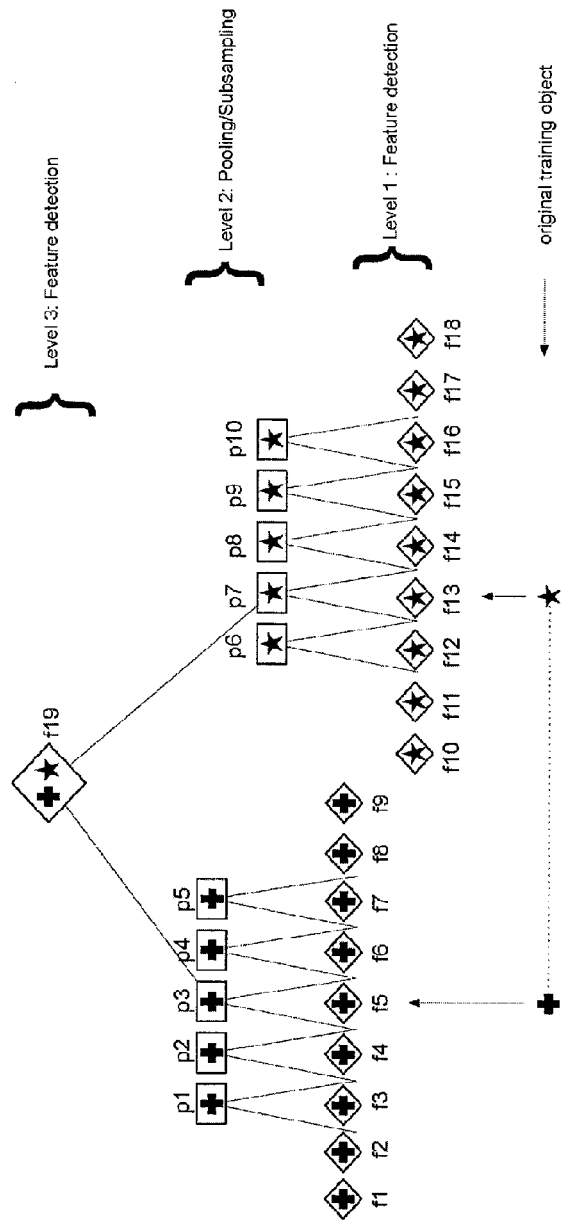
FIGS. 17-20 depict various configurations of a hierarchical network in accordance with exemplary embodiments of the present invention.
Figure 19:
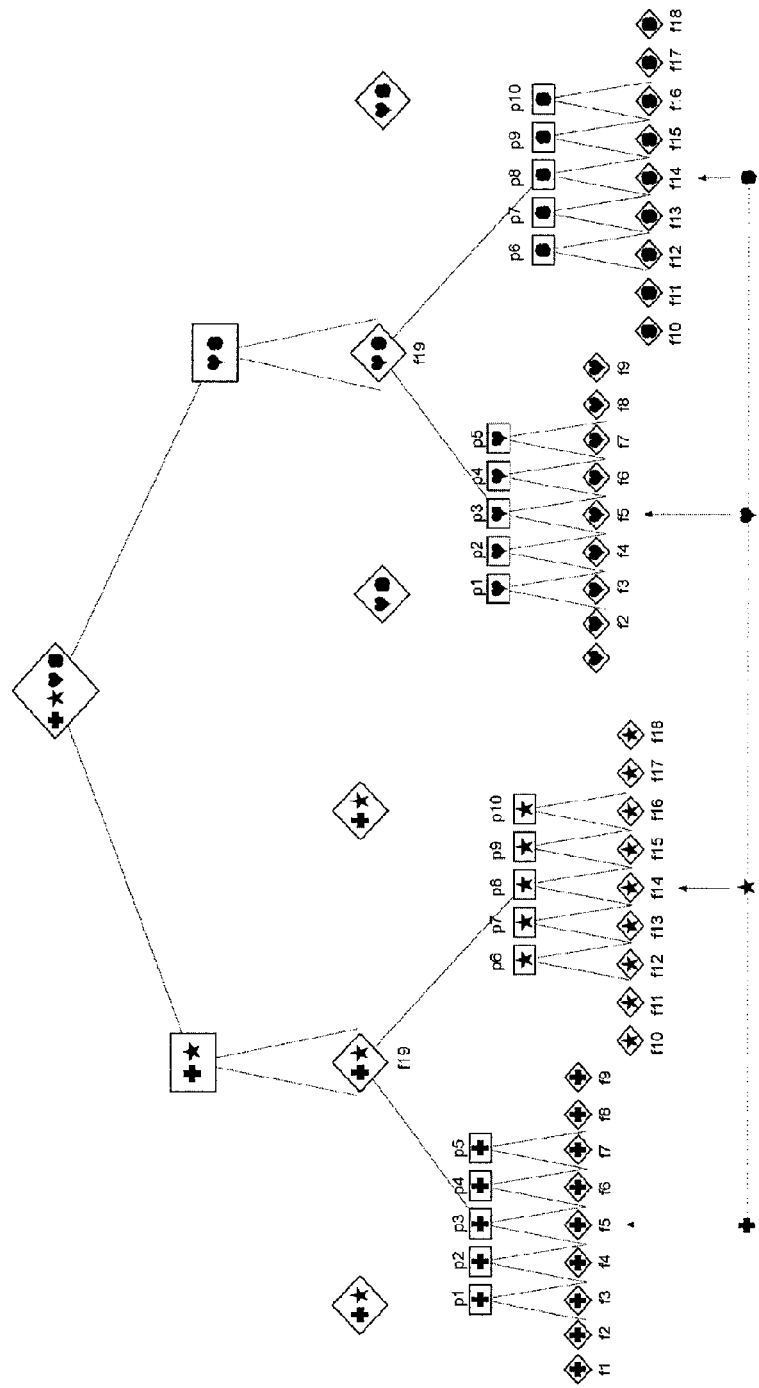
Figure 20:
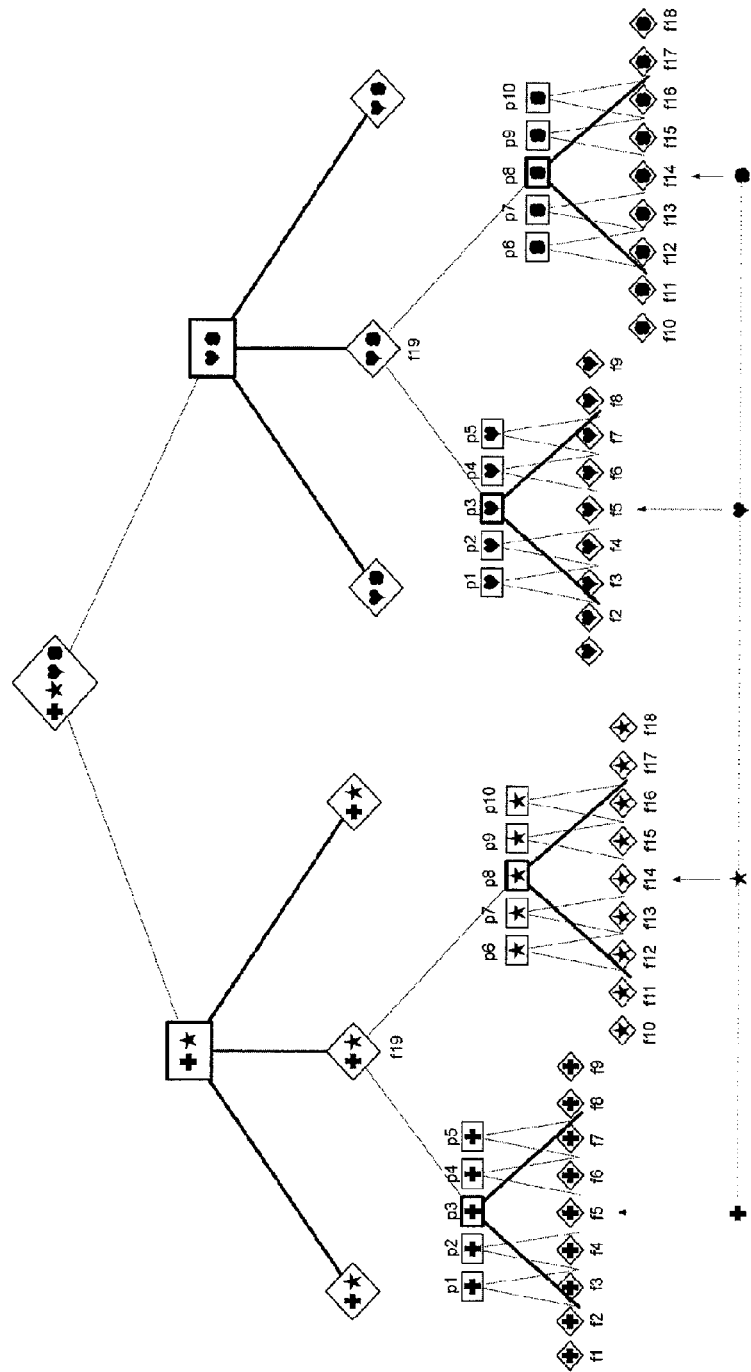

According to embodiments of the present invention, method 1600 can equally be applied for deeper hierarchical levels than those shown in FIGS. 17 and 18. For example, method 1600 can be applied to five-level hierarchical networks as shown in FIGS. 19 and 20. FIG. 19 depicts hierarchical network 1900 where, during a training stage performed by training module 700 of FIG. 7, the pools p1-p10 are configured to only include one child feature.

However, in FIG. 20, the hierarchical feature representation is learned in network 1900. The pools are then turned "ON" to expand their pooling radius including desired features such that all component pools are appropriately synchronized. FIG. 20 depicts a five level network, with two pooling levels and three feature detection levels. The pools are expanded after the well-aligned pools p3 and p8 are chosen as the components for the feature at the next higher level.

Figure 21:
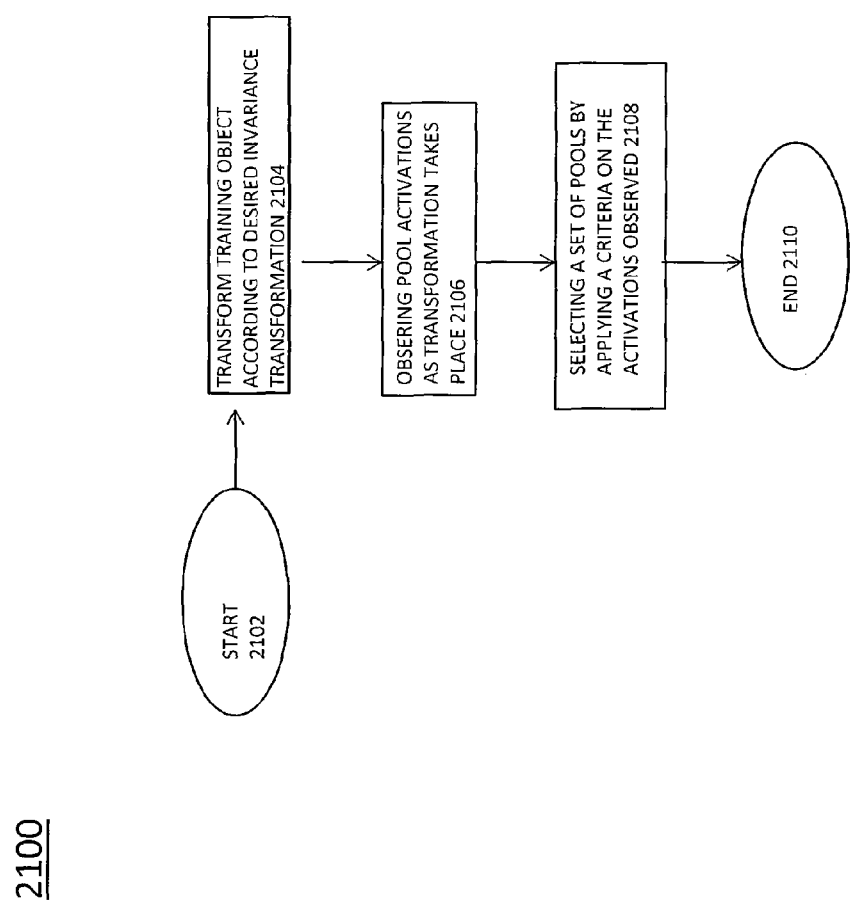
FIG. 21 depicts another method for learning hierarchical networks in accordance with exemplary embodiments of the present invention.

FIG. 21 depicts another method 2100 for learning hierarchical networks in accordance with exemplary embodiments of the present invention. In general, networks could contain pools that are centered on the same feature, but invariant to different transformations. Accordingly, a higher level feature, such as f19 of FIG. 18 should connect to the appropriate subset of active pools p3 and p7 as a training image is translated. The method 2100 is primarily concerned with selecting a set of pools to be part of the higher level feature representation.

The method 2100 begins at step 2102 and proceeds to step 2104, where the training object is transformed from its original position or view. At step 2106, the pool activations are observed as the object is transformed. Subsequently, at step 2108, a set of pools are selected by applying a set of criteria on the activations. The method terminates at step 2110.

According to this embodiment, the transformation to be applied to the training object depends on the transformation that is encoded in the pools and the transformation that the higher-level feature is desired to be invariant to. If the pools are invariant to translation and the higher-level feature are expected to be invariant to translation, then the input object should be translated. If the pools are invariant to scale and rotation and the higher-level feature is expected to represent invariance to rotation, then the training object should be rotated to different views corresponding to the rotationally invariant pools. According to one embodiment, the criterion is a pool combination that is maximally invariant and maximally symmetric.

According to one embodiment, step 2106 and 2108 may be combined, where the selection criteria is based on the timing of the pool activations. According to yet another embodiment, a counter is attached to each pool being observed. The counters are initialized to zero on the first presentation of the object. Subsequently, the training object is transformed L steps to the left followed by R steps to the right, where L and R are the desired steps of invariance from the original position.

For each position of presentation of the object, the counter corresponding to each pool is incremented if the pool is active at that position. Once all the transformations are presented, the counters on the pools will reflect the number of positions for which each pool remained invariant. The pool combination that is appropriate for representing the object invariantly can be obtained by thresh-holding these scores by picking the highest scoring pool or other such selection criteria.

According to some embodiments, method 2100 is implemented using a hidden Markov Model (HMM) with N states, where N is the number of features to be learned at the higher level. The HMM is setup such that the transition probabilities between states are fixed, a priori, in such a manner that it has a high probability of staying within the current state and a low probability of switching out. In this configuration, only the emission probabilities of the HMM states are adapted based on the input data. By changing the parameters of the HMM state transition probabilities, the subset of pools that are stable simultaneously can be picked up by thresh-holding the learned emission probabilities.

Figure 22:
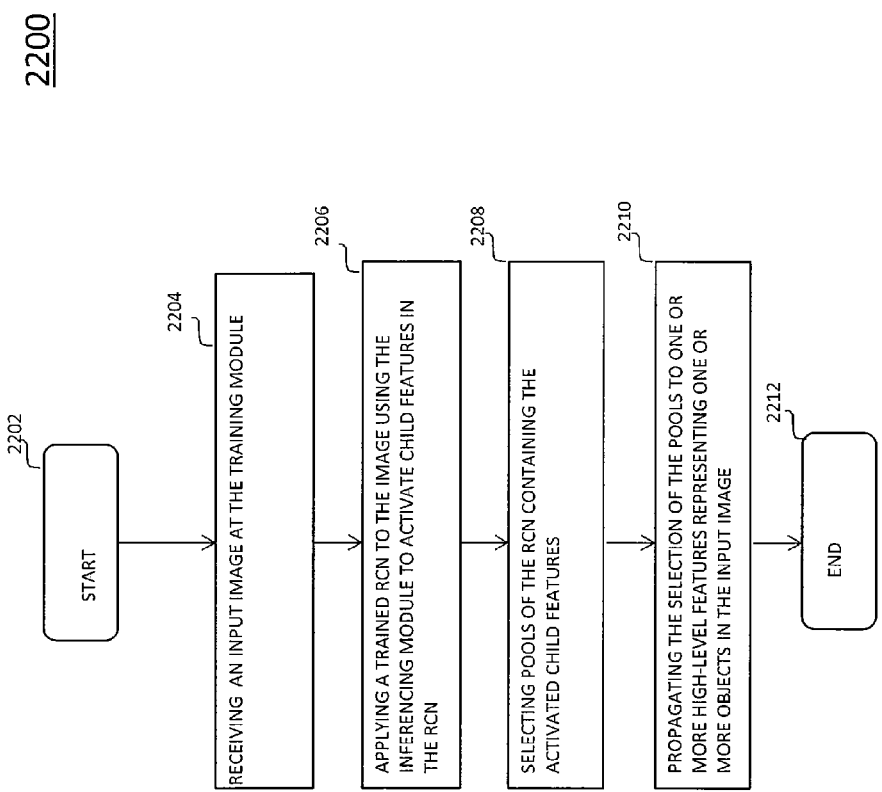
FIG. 22 depicts a method for object recognition using a cortical network in accordance with exemplary embodiments of the present invention.

FIG. 22 depicts a method 2200 for object recognition using a cortical network in accordance with exemplary embodiments of the present invention. The method 2200 depicts the functionality of the inference module 1234 of FIG. 12, as executed by the processor 1202. The method begins at step 2202 and proceeds to step 2204.

At step 2204, the training module 1220 receives an input image from which an inference should be drawn regarding which objects are contained in the input image. At step 2206, the inference module 1234 applies a trained RCN to the image to active the lowest level of child features, i.e., to assign the probabilities of those features existing in the input image. Each of the child features is pooled at a higher level, depending on spatio-temporal nearness of the features in the trained images for the RCN.

At step 2208, the pools select the highest probability features as the pool output, i.e., the pool performs an "OR" across the feature probability responses. At step 2210, the pool output is propagated to the next level of features representing one or more objects or features in the input image until a high-level feature is matched. The method subsequently terminates at step 2212.

Figure 23:
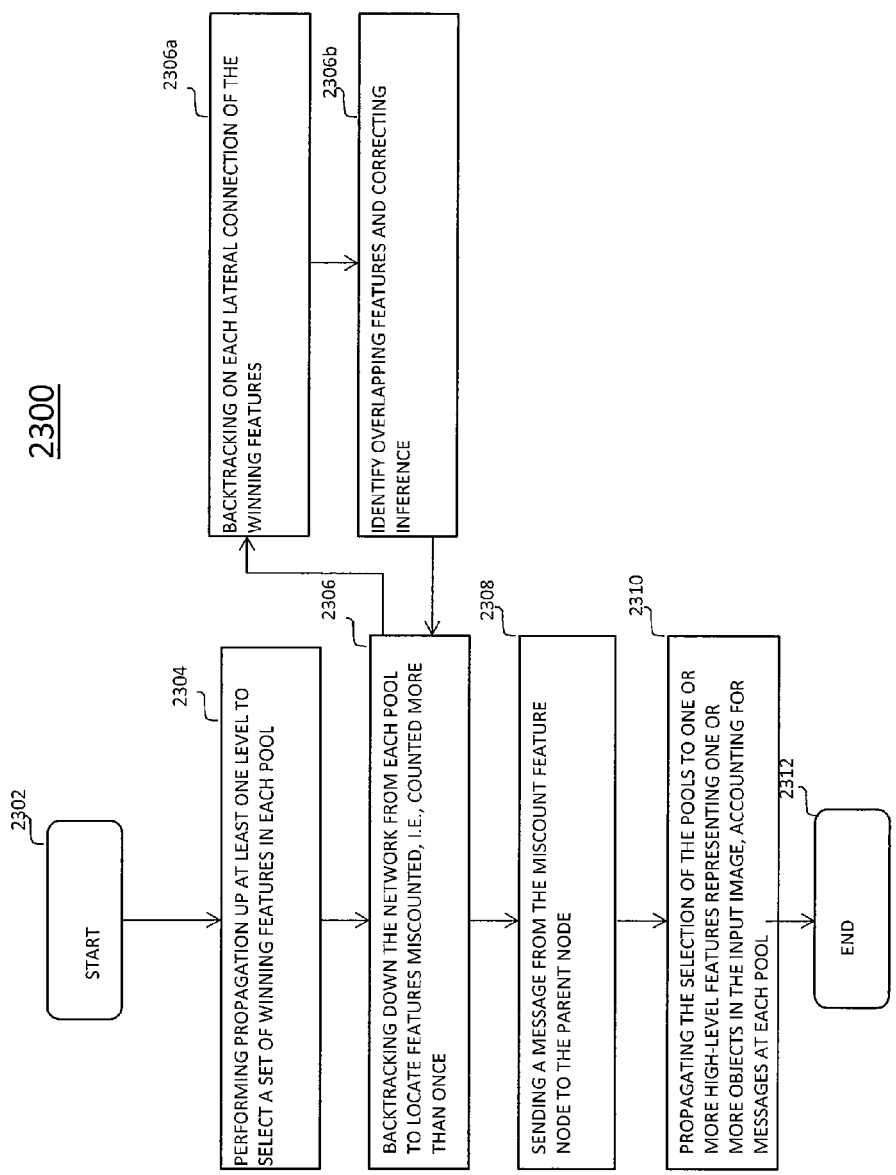
FIG. 23 depicts a method for correcting loopy belief propagation during object matching in a cortical network in accordance with exemplary embodiments of the present invention.

FIG. 23 depicts a method 2300 for correcting loopy belief propagation during object matching in a cortical network in accordance with exemplary embodiments of the present invention. The method 2200 depicts the functionality of the inference module 1234 of FIG. 12, as executed by the processor 1202. The method begins at step 2202 and proceeds to step 2204.

At step 2204, the training module 122 performs belief propagation up at least one level in a hierarchical network, such as network 100 shown in FIG. 1, to select a set of winning features in each pool in the network. At step 2306, the inference module 1234 performs backtracking down the network from each pool to locate features which were miscounted, i.e., features which were counted more than once.

At step 2308, the inference module sends a message from the miscounted feature node to its parent pool, so that the correctly counted probabilities can be propagated to a high level feature. Step 2308 may also contain a step 2306a, where backtracking is further performed on each lateral connection of the winning feature nodes. The inference module 1234 identifies overlapping features at step 2306b based on lateral connections, and corrects the inference using messaging to parent nodes. The parent nodes then account for those overlaps as the message is propagated to higher feature levels.

At step 2310, the pool output is propagated to the next level of features representing one or more objects or features in the input image until a high-level feature is matched. The method subsequently terminates at step 2312.

Figure 24:
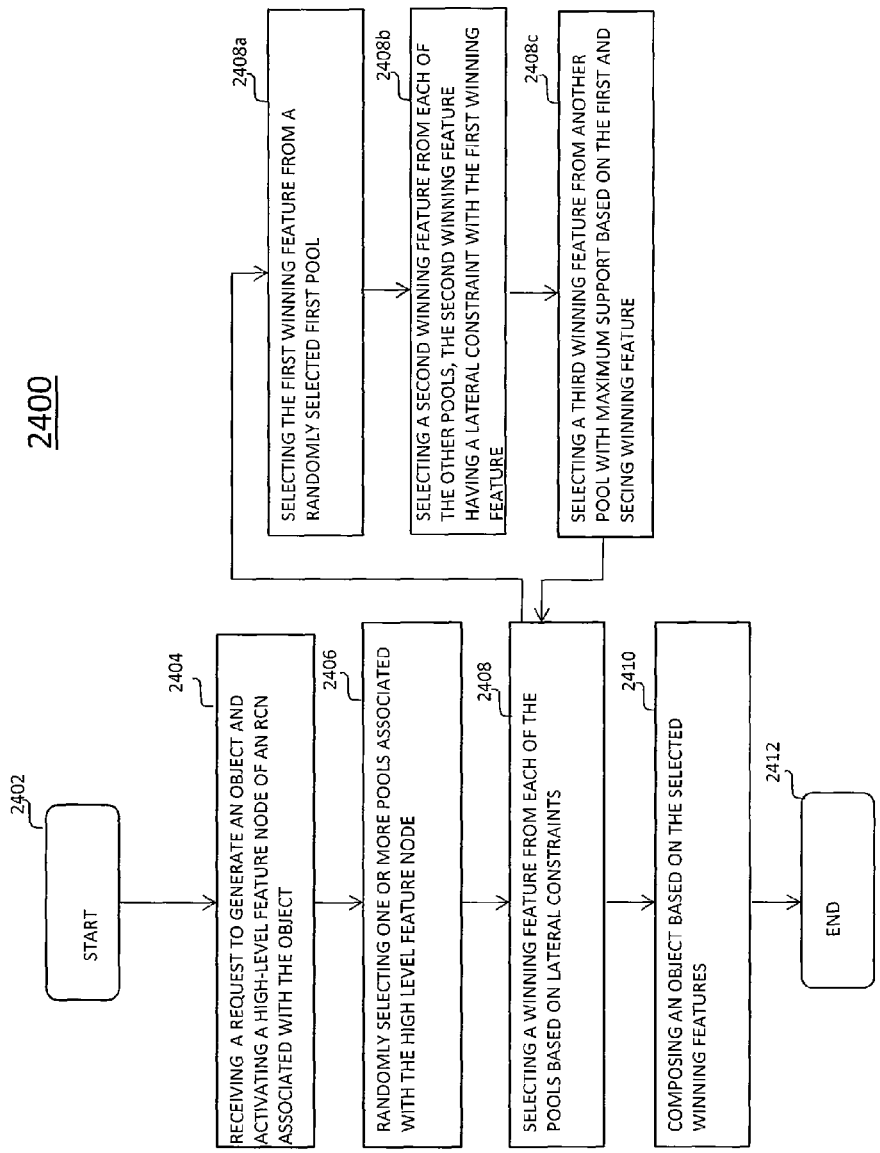
FIG. 24 depicts a method 2400 for generating (sampling) objects using a cortical network in accordance with exemplary embodiments of the present invention.

FIG. 24 depicts a method 2400 for generating (sampling) objects using a cortical network in accordance with exemplary embodiments of the present invention. The method 2400 depicts the functionality of the generation module 1226 of FIG. 12, as executed by the processor 1202. The method begins at step 2202 and proceeds to step 2204.

At step 2404, a request is received at the training module 1220 to generate, or sample, an object, and activate a high-level feature node of an RCN associated with the object. For example, an RCN may have already trained on many motor vehicle images. A user requests that a car be generated using the RCN. The method actives a high-level feature representing a car.

The method then proceeds to step 2406, where the generation module 1226 randomly selects one or more pools associated with the high-level feature node, or the car node. For example, the car node will have pool nodes associated with car doors, wheels, trunks and the like. A winning feature is selected from each of these pools based on lateral constrains at step 2408.

Sub-step 2408a may also be performed, where the first winning feature from a first pool is selected randomly. Subsequently, those features in other pools sharing a lateral constraint with the first winning feature are selected as the second winning features at step 2408b. At step 2408c, a third winning feature with maximum support from the first and second winning feature is selected.

The process 2408a-2408c can be continued for further pools. Additionally, the messages between laterals can be recalculated in the context of the pool choices such that pool configurations that are inconsistent with earlier pool choices cannot be selected. This can include messages and pools in other levels of the hierarchy.

The method then proceeds to step 2410, where the winning features of each pool for the high-level feature are combined to compose an object as the user requested. The method terminates at step 2412. According to other embodiments of the present invention, constraints may be imposed on the selection of pools or winning features. For example, the user may request that the left portion of an object look an expected way, while the right portion of the object may be perturbed or randomly generated. Accordingly, winning features will be selected from each of the pools based on these constraints. According to another embodiment, size, rotation, and the like may be incorporated as constraints.

Methods 2100-2400 may also be applied in the presence of the messages computed as described with reference to FIGS. 15-17. Instead of generating samples from the RCN, the RCN fits the pool selections to best explain the input image. Given a car is a high scoring category, the methods 2100-2400 will refine the pool selections to best explain the car. According to this embodiment, elements from pools are selected by examining which pool elements have the largest amount of evidence. After selecting elements, the messages to other pools can be recomputed to other pools to ensure consistency with of the earlier selection.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A computer-implemented method for object recognition using a recursive cortical network comprising:
    receiving an input image at a training module;
    applying a trained recursive cortical network (RCN) to the image using an inference module to activate child features of the RCN;
    selecting pools of the RCN containing the activated child features; and
    propagating the selection of the pools to identify probabilities of one or more higher-level features matching one or more objects in the input image.

2. The method of claim 1 further comprising:
    selecting a second pool when a child feature in a first pool has a lateral constraint with a child feature in the second pool; and
    repeating applying the trained RCN, selecting pools of the RCN and propagating the selection of the pools, where outputs of child pools in the RCN are input to parent pools of the RCN.

3. The method of claim 2 further comprising:
    during training of the RCN, reducing a pooling radius of a pool in the RCN to zero;
    determining whether a higher level feature is memorized using its component pools; and
    modifying the pooling to include more features if the higher level feature has been memorized to increase invariance to a predetermined threshold.

4. The method of claim 1 further comprising:
    assigning a probability to the activated child feature corresponding to the probability that this feature exists in the input image; and
    selecting the pools of the RCN based on whether the probability is greater than a threshold value.

5. The method of claim 1 further comprising:
    backtracking down the RCN from each pool to locate miscounted features from a set of winning features;

notifying a parent of the double counted feature of the miscounting; and propagating the selection of the pools to one or more high-level features accounting for the miscounted features.

6. The method of claim 5 further comprising:

performing backtracking on each lateral connection for the winning features;

identifying overlapping features; and correcting the probability of the overlapping features.

7. The method of claim 6 further comprising:

performing backtracking on all winning features simultaneously; and correcting inference values for all miscounted features.

8. The method of claim 1 further comprising:

removing a portion of the input image which has been matched to a high-level feature representation; and performing inference on the remaining portion of the image.

9. The method of claim 8 further comprising:

instead of removing a portion of the input image which has been matched, reducing the probability that there was a match in order to account for occluded features.

10. The method of claim 1 further comprising:

receiving a sequence of images at the training module; and matching the sequence of images to high-level features using the RCN.

11. The method of claim 1, wherein the RCN comprises bi-directional links between nodes of the RCN.

12. A computer-implemented method for object generation using a recursive cortical network (RCN) comprising:

activating a high-level feature-node of the RCN according to user entered request;

selecting one of one or more pools associated with the high-level feature node at random;

selecting a winning feature from each of the one or more pools based on lateral connections; and composing an object based on the selected winning features from each pool.

13. The method of claim 12, selecting a winning feature from each of the one or more pools further comprising:

select a first winning feature from the selected pool at random;

selecting a second winning feature from each of the other pools in the one or more pools, having a lateral constraint with the first winning feature; and selecting a third winning feature from each of the other pools not containing lateral support, wherein the third winning feature has maximum support based on the first winning feature and second winning feature.

14. The method of claim 12, further comprising:

determining probabilities for each feature of each pool.

selecting one or more features based on the determined probabilities.

selecting other pools that are laterally consistent with the previously selected pool(s).

15. The method of claim 14 further comprising:

fixing expectation of portions of the composed object and only selecting random winning features on the non-fixed portions of the composed object.

16. An apparatus for object recognition using a recursive cortical network comprising:

a training module for receiving input data; and a processor configured to:

apply a trained recursive cortical network (RCN) to the data using an inference module to activate child features of the RCN corresponding to features in the input data;

select pools of the RCN containing the activated child features; and propagate the selection of the pools to identify probabilities of one or more high-level features matching one or more objects in the input data.

17. The apparatus of claim 16 wherein the image processor is further configured to:

select a second pool when a child feature in a first pool has a lateral constraint with a child feature in the second pool.

18. The apparatus of claim 17 wherein the image processor is further configured to:

during training of the RCN, reduce a pooling radius of a pool in the RCN to zero;

determine whether a higher level feature is memorized using its component pools; and modify the pooling to include more features if the higher level feature has been memorized to increase invariance to a predetermined threshold.

19. The apparatus of claim 16 wherein the image processor is further configured to:

assign a probability to the activated child feature corresponding to the probability that this feature exists in the input image; and select the pools of the RCN based on whether the probability is greater than a threshold value.

20. The apparatus of claim 16 wherein the image processor is further configured to:

backtrack down the RCN from each pool to locate miscounted features from a set of winning features;

notify a patent of the double counted feature of the miscounting; and propagate the selection of the pools to one or more high-level features accounting for the miscounted features.

21. The apparatus of claim 16, further comprising wherein the input data may be one or more of an image, an image sequence, audio data, and video data.

22. The apparatus of claim 16, wherein the RCN comprises bi-directional links between nodes of the RCN.

* * * * *